(12) United States Patent
Ogawa

(10) Patent No.: US 8,115,816 B2
(45) Date of Patent: Feb. 14, 2012

(54) IMAGE CAPTURING METHOD, CONTROL METHOD THEREFOR, AND PROGRAM

(75) Inventor: Kaname Ogawa, Kanagawa (JP)

(73) Assignee: Sony Corporation (JP)

( * ) Notice: Subject to any disclaimer, the term of this patent is extended or adjusted under 35 U.S.C. 154(b) by 419 days.

(21) Appl. No.: 12/380,836

(22) Filed: Mar. 4, 2009

(65) Prior Publication Data

US 2009/0225173 A1    Sep. 10, 2009

(30) Foreign Application Priority Data

Mar. 5, 2008  (JP) ................. P2008-055575

(51) Int. Cl.
  *H04N 5/225*  (2006.01)
  *H04N 9/04*  (2006.01)
(52) U.S. Cl. ................ 348/207.99; 348/231.4; 382/190; 382/209
(58) Field of Classification Search ............ 348/135, 348/142, 207.99, 208.14, 208.15, 208.16, 348/231.2, 231.4, 231.6, 345, 346, 333.01; 382/118, 156, 190, 209, 289, 291, 305, 306
See application file for complete search history.

(56) References Cited

U.S. PATENT DOCUMENTS

| | | | | |
|---|---|---|---|---|
| 5,552,850 A * | 9/1996 | Matsumoto | ................... | 396/544 |
| 5,642,431 A * | 6/1997 | Poggio et al. | ................. | 382/118 |
| 5,822,621 A * | 10/1998 | Szajewski | .......................... | 396/6 |
| 6,144,755 A * | 11/2000 | Niyogi et al. | ................. | 382/118 |
| 6,301,440 B1 * | 10/2001 | Bolle et al. | .................... | 396/128 |
| 7,339,613 B2 * | 3/2008 | Lee et al. | ................. | 348/208.99 |
| 7,778,429 B2 * | 8/2010 | Yoshino | ........................ | 381/124 |
| 7,884,851 B2 * | 2/2011 | Heymann | ................. | 348/207.99 |
| 2002/0102024 A1 * | 8/2002 | Jones et al. | ..................... | 382/225 |
| 2003/0142216 A1 * | 7/2003 | Jelinek | ..................... | 348/207.99 |
| 2005/0094894 A1 * | 5/2005 | Yonaha | ......................... | 382/275 |
| 2005/0280809 A1 | 12/2005 | Hidai et al. | | |
| 2007/0183638 A1 * | 8/2007 | Nakamura | .................... | 382/128 |
| 2008/0037841 A1 * | 2/2008 | Ogawa | .......................... | 382/118 |

FOREIGN PATENT DOCUMENTS

| | | |
|---|---|---|
| JP | 2002-107807 A | 4/2002 |
| JP | 2005-157679 A | 6/2005 |
| WO | WO 2006056655 A1 * | 6/2006 |

* cited by examiner

*Primary Examiner* — Lin Ye
*Assistant Examiner* — Chriss Yoder, III
(74) *Attorney, Agent, or Firm* — Lerner, David, Littenberg, Krumholz & Mentlik, LLP

(57) ABSTRACT

An image capturing apparatus includes an image capturing unit that captures an image of a subject and generates a captured image; a determination-information storage unit that stores items of determination information, each item of determination information being used to determine whether the captured image includes a corresponding one of target objects; an operation accepting unit that accepts a specifying operation of specifying at least one of the target objects for which the items of determination information are stored; a target-object detecting unit that selects determination information regarding the specified target object from among the items of determination information stored in the determination-information storage means and detects the specified target object in the captured image using the selected determination information; and a recording control unit that causes the captured image generated at the time the specified target object is detected to be recorded.

1 Claim, 26 Drawing Sheets

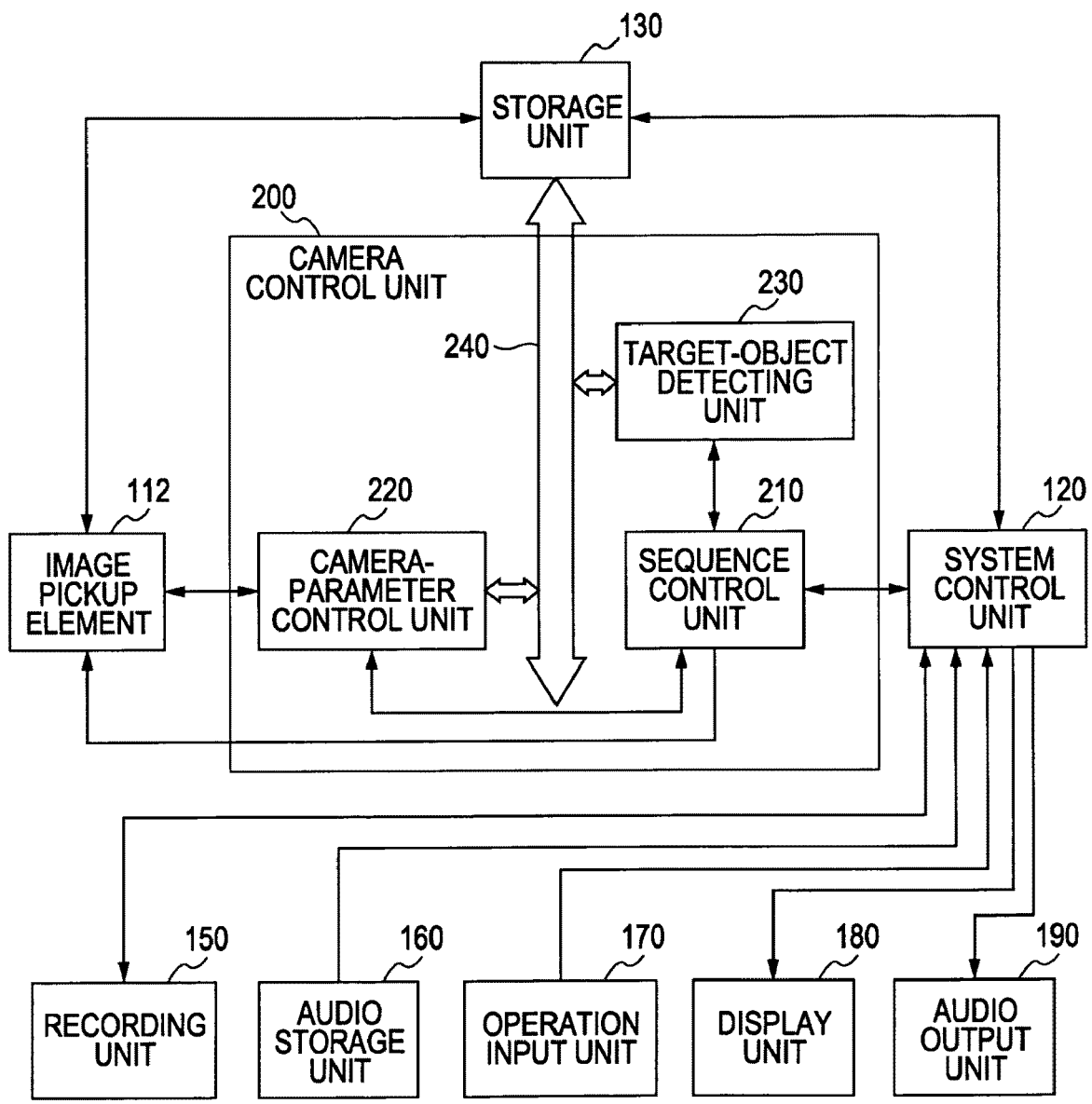

FIG. 6

| TARGET-OBJECT | AUDIO INFORMATION |
|---|---|
| DOG | BOW-WOW |
| CAT | MEOW-MEOW |

FIG. 8
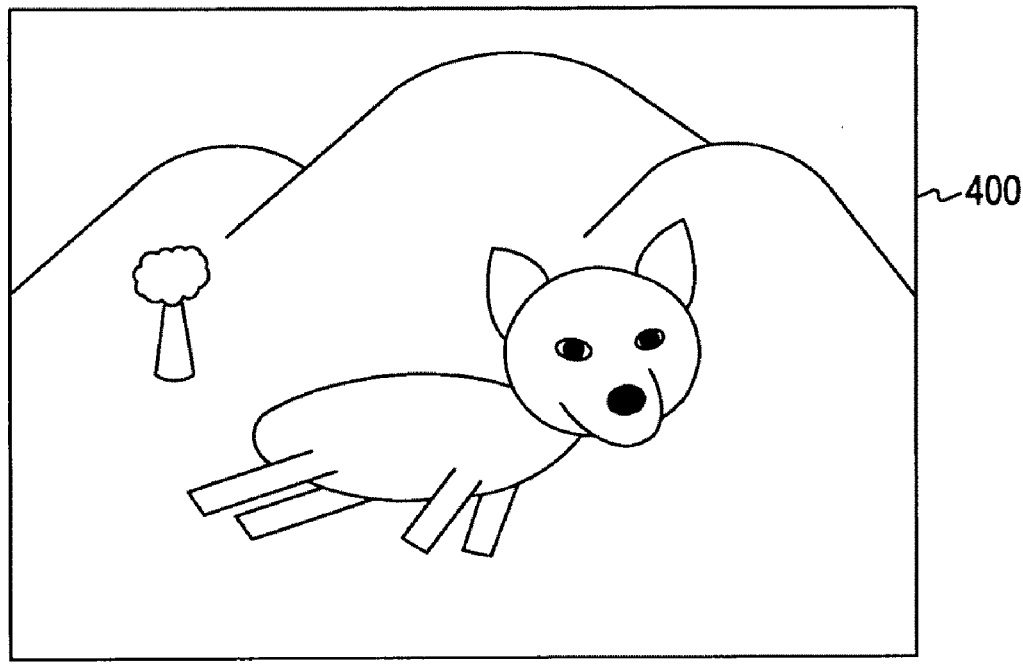
(a)
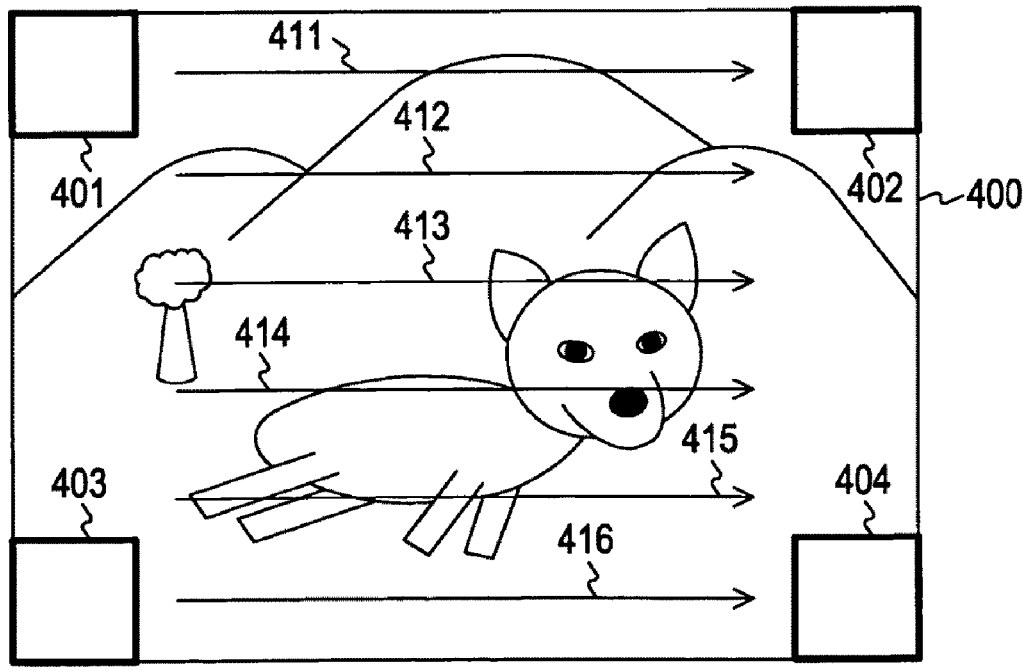
(b)

FIG. 11
(a)
480
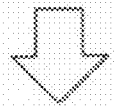
(b)
480
481

FIG. 24

| TARGET OBJECT | AUDIO INFORMATION | |
| --- | --- | --- |
| | NOT BLURRED | BLURRED |
| DOG | BOW-WOW | KI-YI |
| CAT | MEOW-MEOW | FFT-FFT |

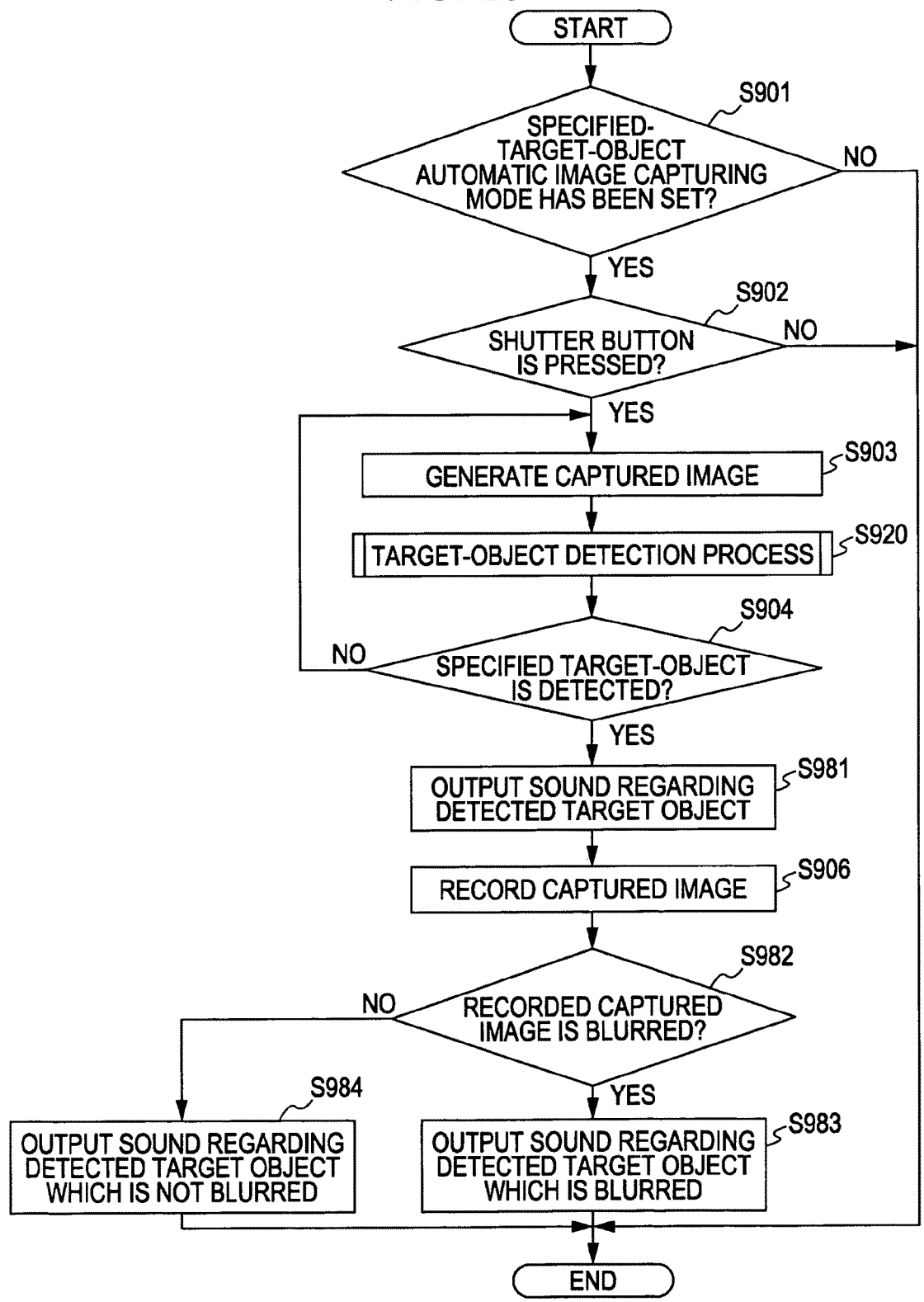

_US 8,115,816 B2_

IMAGE CAPTURING METHOD, CONTROL METHOD THEREFOR, AND PROGRAM

CROSS REFERENCES TO RELATED APPLICATIONS

The present application claims priority from Japanese Patent Application No. JP 2008-055575, filed in the Japanese Patent Office on Mar. 5, 2008, the entire content of which is incorporated herein by reference.

BACKGROUND OF THE INVENTION

1. Field of the Invention

The present invention relates to image capturing apparatuses, and more particularly, to an image capturing apparatus that can detect a target object, such as an animal, in a captured image, a control method therefor, and a program for causing a computer to execute the method.

2. Description of the Related Art

Hitherto, image capturing apparatuses such as digital still cameras which capture images of subjects such as persons, generate captured images, and record the captured images have become widely spread. Also in the recent years, an increasing number of people are becoming interested in animals, such as dogs and cats. Many people have these animals as their pets at home.

A captured image recorded using an image capturing apparatus such as a digital still camera can be saved as image data. Because the image data can be easily deleted, many people nowadays often capture images of target objects that these people are interested in. For example, images of pets at home are frequently captured.

However, when a photographer wishes to capture an image of an animal, such as a dog or a cat, the animal has difficulty in understanding the photographer's instructions. Therefore, even when the photographer points an image capturing apparatus toward the animal, the animal may not necessarily assume a posture as desired by the photographer. For example, even when a photographer who wishes to capture an image of the front side of the face of a dog points an image capturing apparatus toward the front side of the dog, the front side of the dog's face is not necessarily directed toward the image capturing apparatus. Even when the photographer points the image capturing apparatus toward the front side of the dog's face, the dog may face a different direction. Therefore, for example, when a photographer wishes to capture the front side of the face of an animal, such as a dog or a cat, it is important to bring the front side of the animal's face to face the image capturing apparatus.

Accordingly, a camera that outputs sound that is interesting to a pet serving as a subject in response to halfway pressing of a release button by a user, and, in response to all-the-way pressing of the release button by the user who determines that the pet has faced the camera, exposes an image of the subject captured at the time of this all-the-way pressing onto a silver salt film has been proposed (for example, see Japanese Unexamined Patent Application Publication No. 2002-107807 (FIG. 5)).

SUMMARY OF THE INVENTION

With the foregoing related art, by outputting sound that is interesting to a pet serving as a subject, the possibility of drawing the pet's attention to the camera can be increased. When the front side of the pet is directed toward the camera, the user presses the release button all the way, thereby recording a captured image of the pet facing front.

However, although it is conceivable that an animal such as a dog or a cat pays attention to a subtle change in sound or the like and directs its face toward the image capturing apparatus, the animal may instantly face another direction. Also, an animal such as a dog or a cat is often restless. It may thus be difficult for a user to know the appropriate timing to press the release button all the way.

In order to record a captured image of the front side of the face of an animal that does not understand a photographer's instructions, it is important to record a captured image at an appropriate timing at which the animal's face is directed toward the image capturing apparatus. Also, when a photographer wishes to capture an image of a baby who does not understand the photographer's instructions, it is important to record a captured image at an appropriate timing at which the baby's face is directed toward the image capturing apparatus.

It is desirable to provide the techniques of appropriately recording a captured image of a target object that does not understand a photographer's instructions.

According to a first embodiment of the present invention, there are provided an image capturing apparatus, a control method therefor, and a program for causing a computer to execute the method. The image capturing apparatus includes the following elements: image capturing means for capturing an image of a subject and generating a captured image; determination-information storage means for storing a plurality of items of determination information, each item of determination information being used to determine whether the captured image includes a corresponding one of a plurality of target objects; operation accepting means for accepting a specifying operation of specifying at least one of the plurality of target objects for which the plurality of items of determination information are stored; target-object detecting means for selecting determination information regarding the specified target object from among the plurality of items of determination information stored in the determination-information storage means and detecting the specified target object in the captured image using the selected determination information; and recording control means for causing the captured image generated at the time the specified target object is detected to be recorded. Accordingly, advantageously, when a specified target object is detected in a captured image using determination information regarding the target object, a captured image generated at the time the target object is detected is recorded.

The image capturing apparatus according may further include audio-information storage means for storing audio information regarding each of the plurality of target objects, for which the plurality of items of determination information are stored, in association with the target object; and audio-output control means for causing, at the time the recording control means causes the captured image to be recorded, sound corresponding to audio information stored in association with the detected target object in the audio-information storage means to be output. Accordingly, advantageously, at the time a captured image is recorded, sound corresponding to audio information associated with a detected target object is output. In this case, the target object may be the face of an animal, and the audio information may represent the bark of the animal. Accordingly, advantageously, when the face of a specified animal is detected in a captured image, the bark of the detected animal is output. Alternatively in this case, the target object may be the face of a human baby, and the audio information may represent the voice of a human being calling the baby. Accordingly, advantageously, when the face of a human baby is detected in a captured image, the voice calling the baby is output.

The image capturing apparatus may further include the following elements: audio-information storage means for storing audio information regarding each of the plurality of target objects, for which the plurality of items of determination information are stored, in association with the target object, the audio information being in accordance with a result of evaluation of the captured image; captured-image evaluating means for evaluating the captured image at the time the recording control means causes the captured image to be recorded; and audio-output control means for causing sound corresponding to the audio information to be output in accordance with the evaluation result obtained by the captured-image evaluating means. Accordingly, advantageously, a captured image is evaluated at the time of recording it, and sound corresponding to audio information is output in accordance with the evaluation result.

The operation accepting means may accept a specifying operation of specifying a plurality of target objects among the plurality of target objects for which the plurality of items of determination information are stored. The recording control means may cause the captured image generated at the time at least one of the specified plurality of target objects is detected to be recorded. Accordingly, advantageously, a captured image generated at the time at least one of a plurality of specified target objects is detected is recorded.

The operation accepting means may be a touch panel that displays a specifying button for specifying at least one of the plurality of target objects for which the plurality of items of determination information are stored. Accordingly, advantageously, a target object is specified using the specifying button displayed on the touch panel.

The image capturing apparatus may further include image-capturing control means for performing image capturing control by setting a predetermined image capturing parameter on the basis of the detected target object. Accordingly, advantageously, image capturing control is performed by setting a predetermined image capturing parameter on the basis of a detected target object.

According to a second embodiment of the present invention, there are provided an image capturing apparatus, a control method therefor, and a program for causing a computer to execute the method. The image capturing apparatus includes the following elements: audio-information storage means for storing audio information regarding each of a plurality of target objects in association with the target object; operation accepting means for accepting a specifying operation of specifying at least one of the plurality of target objects stored in the audio-information storage means; image capturing means for capturing an image of a subject and generating a captured image; target-object detecting means for detecting the specified target object in the captured image; audio-output control means for causing, at the time the specified target object is detected, sound corresponding to audio information stored in association with the detected target object in the audio-information storage means to be output; and recording control means for causing the captured image to be recorded after the sound corresponding to the audio information regarding the detected target object is output. Accordingly, advantageously, when a specified target object is detected in a captured image, sound corresponding to audio information regarding the detected target object is output, and, after the sound is output, a captured image is recorded.

Each of the plurality of target objects stored in the audio-information storage means may have a front side and a lateral side. The target-object detecting means may detect the front side or the lateral side of the specified target object in the captured image. The audio-output control means may cause, at the time the front side or the lateral side of the specified target object is detected, sound corresponding to audio information stored in the audio-information storage means in association with the target object whose front side or lateral side is detected to be output. The recording control means may cause the captured image to be recorded when, at the time the front side of the specified target object is detected, sound corresponding to audio information regarding the target object whose front side is detected is output. Accordingly, advantageously, when the front side or the lateral side of a specified target object is detected in a captured image, sound corresponding to audio information regarding the target object whose front side or lateral side is detected is output. When, at the time the front side of the specified target object is detected, sound corresponding to audio information regarding the target object whose front side is detected is output, a captured image is recorded. In this case, the audio-output control means may cause, when the front side of the specified target object is detected after the lateral side of the specified target object is detected, the sound corresponding to the audio information regarding the target object whose front side is detected to be output. Accordingly, advantageously, when the front side of a specified target object is detected after the lateral side of the target object is detected, sound corresponding to audio information regarding the target object is output.

The recording control means may cause the captured image generated immediately after the sound corresponding to the audio information regarding the detected target object is output to be recorded. Accordingly, advantageously, a captured image generated immediately after sound corresponding to audio information regarding a detected target object is output is recorded.

The audio-output control means may cause, at the time the specifying operation is accepted by the operation accepting means, sound corresponding to audio information stored in association with the specified target object in the audio-information storage means to be output, and, at the time the specified target object is detected, cause the sound corresponding to the audio information stored in association with the detected target object in the audio-information storage means to be output. Accordingly, advantageously, at the time a specifying operation is accepted, sound corresponding to audio information regarding a target object specified by the specifying operation is output. At the time the specified target object is detected, sound corresponding to audio information regarding the detected target object is output.

The audio-information storage means may store items of audio information regarding the plurality of target objects. The operation accepting means may accept a specifying operation of specifying a plurality of target objects among the plurality of target objects stored in the audio-information storage means. The audio-output control means may cause, at the time at least one of the specified plurality of target objects is detected, sound corresponding to audio information stored in association with the detected target object in the audio-information storage means to be output. Accordingly, advantageously, when a specifying operation of specifying a plurality of target objects is accepted, at the time at least one of the specified plurality of target objects is detected, sound corresponding to audio information regarding the detected target object is output.

According to the embodiments of the present invention, there is an advantage that a captured image of a target object that does not understand a photographer's instructions can be appropriately recorded.

BRIEF DESCRIPTION OF THE DRAWINGS

FIG. 2 is a block diagram showing an exemplary functional structure of a camera control unit according to the embodiment of the present invention;

FIG. 6 is a diagram schematically showing the details stored in an audio storage unit according to the embodiment of the present invention;

FIG. 8 includes diagrams showing the outline of an image extracting method of extracting an image to be determined in a target-object determination process performed by a target-object determining unit according to the embodiment of the present invention;

FIG. 11 includes diagrams showing an example of a captured image displayed on the liquid crystal panel according to the embodiment of the present invention;

FIG. 24 is a diagram schematically showing the details stored in another audio storage unit according to the embodiment of the present invention;

FIG. 26 is a flowchart showing the procedure of a captured-image recording process performed by the image capturing apparatus according to the embodiment of the present invention.

DESCRIPTION OF THE PREFERRED EMBODIMENTS

Embodiments of the present invention will now be described in detail with reference to the drawings.

Figure 1:
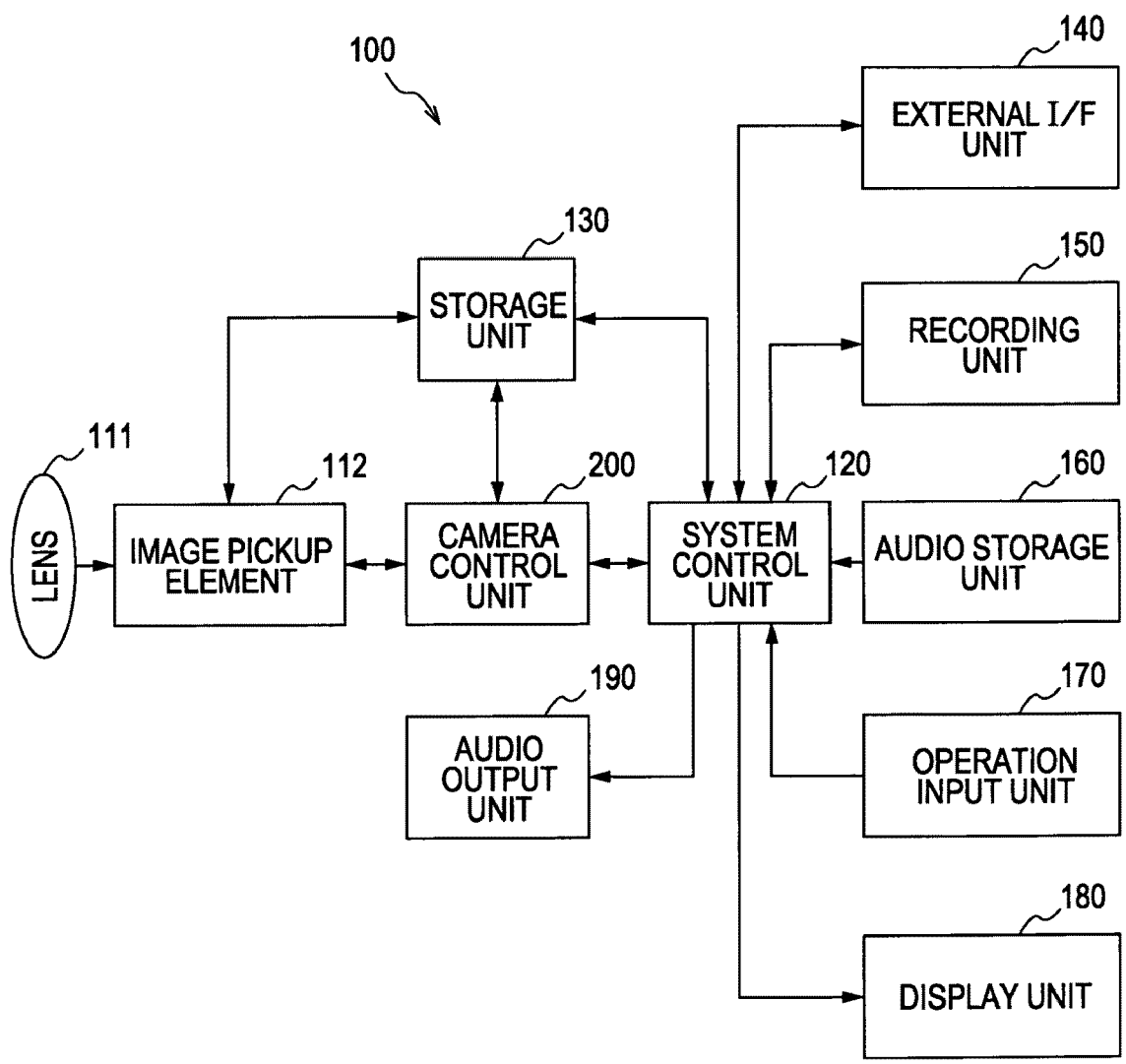
FIG. 1 is a block diagram showing an exemplary structure of an image capturing apparatus according to an embodiment of the present invention.

FIG. 1 is a block diagram showing an exemplary structure of an image capturing apparatus 100 according to an embodiment of the present invention. The image capturing apparatus 100 includes a lens 111, an image pickup unit 112, a system control unit 120, a storage unit 130, an external interface (I/F) unit 140, a recording unit 150, an audio storage unit 160, an operation input unit 170, a display unit 180, an audio output unit 190, and a camera control unit 200. The image capturing apparatus 100 can be implemented by, for example, a digital still camera that can capture an image of a subject, generate image data, extract feature amounts by performing image analysis of the image data, and apply various types of image processing using the extracted feature amounts.

The lens 111 is an assembly of a plurality of lenses (zoom lens, focus lens, and the like) which collect light reflected from a subject. Incident light reflected from the subject is passed through these lenses and directed to the image pickup unit 112.

The image pickup unit 112 includes an image pickup element (not shown) with an electrical shutter function and a signal processing part (not shown) that processes an output signal of the image pickup element and generates a captured image. That is, in the image pickup unit 112, an optical image of a subject, which enters via the lens 111, is formed on an image pickup face of the image pickup element. In this state, the image pickup element performs an image capturing operation, and the signal processing part performs signal processing of the captured image signal, thereby generating a captured image. The generated captured image is supplied to and saved in the storage unit 130. Camera parameters (image capturing parameters) used in generating a captured image are sequentially determined by the camera control unit 200.

The camera control unit 200 controls the image pickup unit 112 under control of the system control unit 120 and on the basis of the captured image supplied from the image pickup unit 112 via the storage unit 130. The camera control unit 200 will be described in detail with reference to FIG. 2.

The system control unit 120 controls the entire image capturing apparatus 100. For example, the system control unit 120 performs control in accordance with an operation entered by a user and accepted by the operation input unit 170. Also, the system control unit 120 controls, for example, displaying of a menu screen and the like displayed on the display unit 180, recording and reading of a captured image to/from the recording unit 150, and communication with an external computer and a network via the external I/F unit 140. At the time of monitoring during an image capturing operation, the system control unit 120 performs a control operation to display a captured image generated by the image pickup unit 112 on the display unit 180. When a specified-target-object automatic image capturing mode is set, the system control unit 120 performs output control (playback control of sound effects) of outputting sound corresponding to audio information stored in the audio storage unit 160 from the audio output unit 190 and recording control of recording a captured image in the recording unit 150 on the basis of whether a specified object has been detected. The specified-target-object automatic image capturing mode stated here is an image capturing mode in which, when a target object specified by a user is detected in a captured image, sound corresponding to audio information regarding the specified target object is output, and a captured image obtained at the time of this detection is recorded. The specified-target-object automatic image capturing mode will be described in detail with reference to FIGS. 13, 14, and the like.

The storage unit 130 is a main storage unit that temporarily saves captured images and the like in a system of the image capturing apparatus 100 and is implemented by, for example, a dynamic random-access memory (DRAM). That is, exchange of a captured image between elements in the image capturing apparatus 100 is performed mainly via the storage unit 130.

The external I/F unit 140 is an external interface including an input/output terminal such as a universal serial bus (USB) terminal and provides an interface for establishing a connection with an external computer or a network.

Under control of the system control unit 120, the recording unit 150 records a captured image generated by the image pickup unit 112. Also, under control of the system control unit 120, the recording unit 150 reads a recorded captured image and supplies the captured image to the system control unit 120. As the recording unit 150, for example, a recording medium such as a flash memory can be used. Alternatively, the recording unit 150 may be included in advance in the image capturing apparatus 100 or removably connected to the image capturing apparatus 100.

The audio storage unit 160 stores various items of audio information. Under control of the system control unit 120, sound corresponding to audio information stored in the audio storage unit 160 is output from the audio output unit 190. The audio storage unit 160 will be described in detail with reference to FIG. 6.

The operation input unit 170 is an external operation member, such as a shutter button 171 (shown in FIGS. 3A and 3B and the like), which is provided outside a casing. Upon receipt of an operation entered by the user, the operation input unit 170 outputs a signal in accordance with the accepted operation to the system control unit 120.

The display unit 180 is a display unit that displays various images under control of the system control unit 120. For example, the display unit 180 displays, for example, a captured image generated by the image pickup unit 112, a captured image read from the recording unit 150, and a menu screen provided to the user (e.g., a "menu for specifying a target object for automatic image capturing" screen shown in FIG. 7).

Under control of the system control unit 120, the audio output unit 190 outputs sound corresponding to audio information stored in the audio storage unit 160. The audio output unit 190 can be implemented by, for example, a loudspeaker.

FIG. 2 is a block diagram showing an exemplary functional structure of the camera control unit 200 according to the embodiment of the present invention. FIG. 2 shows, besides the exemplary functional structure of the camera control unit 200, the structure including elements other than the lens 111 and the external I/F unit 140 shown in FIG. 1. The camera control unit 200 includes a sequence control unit 210, a camera-parameter control unit 220, a target-object detecting unit 230, and a storage unit I/F 240. Exchange of a captured image between the storage unit 130 and the camera-parameter control unit 220 and between the storage unit 130 and the target-object detecting unit 230 is performed via the storage unit I/F 240.

The sequence control unit 210 is activated by an image capturing standby command from the system control unit 120 and maintains a state in which a captured image generated by the image pickup unit 112 can be recorded. In this image capturing standby state, captured images generated by the image pickup unit 112 are sequentially stored in the storage unit 130. For example, a captured image stored in the storage unit 130 is sequentially updated at intervals of ⅟₆₀ seconds. The sequence control unit 210 controls the camera-parameter control unit 220 to determine camera parameters on the basis of the current captured image stored in the storage unit 130 (the captured image currently generated by the image pickup unit 112). Also, the sequence control unit 210 controls the target-object detecting unit 230 to detect a target object specified by the user using the operation input unit 170 in the current captured image stored in the storage unit 130. When target-object detection information indicating that the specified target object has been detected is output from the target-object detecting unit 230, the sequence control unit 210 outputs an instruction to record the captured image to the image pickup unit 112 and performs recording control of the captured image. At the same time, the sequence control unit 210 outputs information indicating that the specified target object has been detected to the system control unit 120. When the information indicating that the specified target object has been detected is output, the system control unit 120 outputs audio information regarding the specified target object and records the current captured image in the recording unit 150.

When triggered by the sequence control unit 210, the camera-parameter control unit 220 obtains the current captured image stored in the storage unit 130 via the storage unit I/F 240, evaluates the current captured image, and determines camera parameters such as the shutter speed, the exposure, and the white balance. Using the determined camera parameters, the camera-parameter control unit 220 performs image capturing control of the image pickup unit 112. When the specified-target-object automatic image capturing mode has been set, if a specified target object is detected in the current captured image, the camera-parameter control unit 220 determines camera parameters, such as the shutter speed, the exposure, and the white balance, on the basis of the specified target object and the evaluation of the current captured image. For example, when a dog is specified, if a dog's face is detected, camera parameters optimal for the dog's face are determined on the basis of the position and the size of the detected dog's face in the captured image.

When triggered by the sequence control unit 210, the target-object detecting unit 230 obtains the current captured image stored in the storage unit 130 via the storage unit I/F 240, detects a target object specified by the user using the operation input unit 170 in the current captured image, and, if the specified target object is detected, outputs target-object detection information including the position and the size of the detected target object in the captured image and a score indicating the degree of the target object to the sequence control unit 210. Detection of the target object can be performed by, for example, a detector using rectangle features (e.g., see Japanese Unexamined Patent Application Publication No. 2005-157679). The target-object detecting unit 230 will be described in detail with reference to FIG. 4.

Figure 3A:
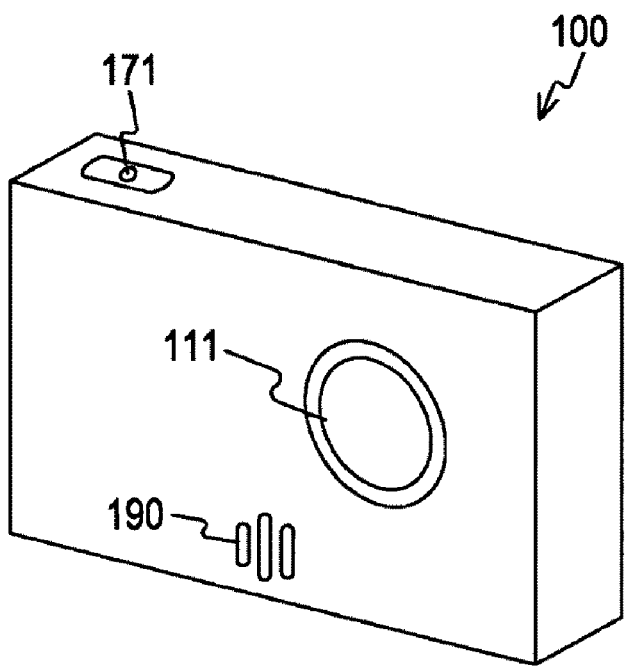
FIGS. 3A and 3B are perspective views showing the external appearance of the image capturing apparatus according to the embodiment of the present invention.
Figure 3B:
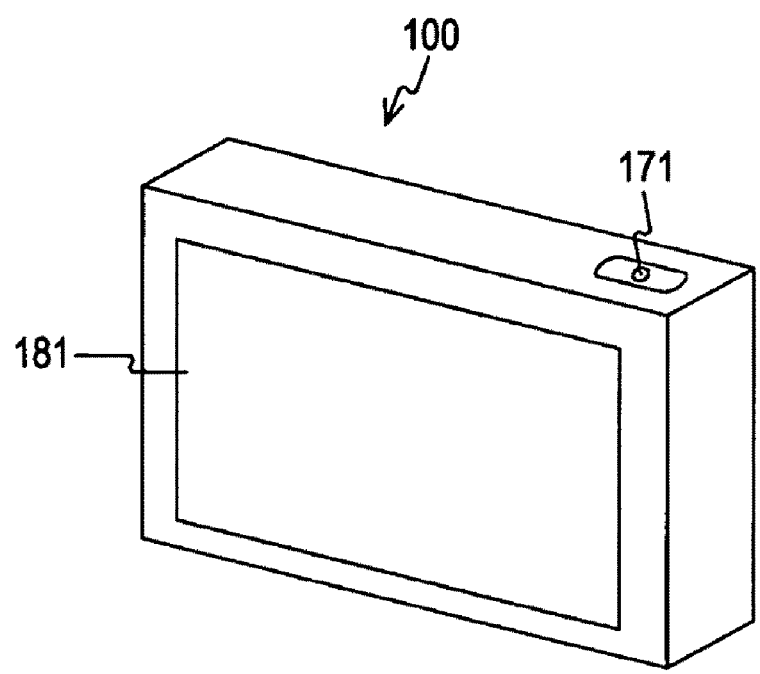

FIGS. 3A and 3B are perspective views showing the external appearance of the image capturing apparatus 100 according to the embodiment of the present invention. FIG. 3A shows the external appearance of the front side of the image capturing apparatus 100 (that is, the face of the lens 111 pointed toward a subject). FIG. 3B shows the external appearance of the back side of the image capturing apparatus 100 (that is, the face of a liquid crystal panel 181 pointed toward the photographer).

The image capturing apparatus 100 includes the lens 111, the shutter button 171, the liquid crystal panel 181, and the audio output unit 190. Although the image capturing apparatus 100 includes another operation member such as a power switch as the operation input unit 170, a drawing and a description thereof are omitted. Since the lens 111 and the audio output unit 190 are the same as those shown in FIG. 1, the same reference numerals are given to these elements, and a detailed description thereof is omitted. Some or all of the assembly of lenses included in the lens 111 and the audio output unit 190 are included in a casing of the image capturing apparatus 100.

The liquid crystal panel 181 is a liquid crystal panel that displays, for example, a captured image generated by the image pickup unit 112. Also, the liquid crystal panel 181 may be a touch panel displaying various selections buttons. Using the touch panel, operations can be entered by touching regions of these selection buttons with a finger, for example. That is, the liquid crystal panel 181 corresponds to the display unit 180 and the operation input unit 170 shown in FIG. 1. Display examples of these selection buttons will be described in detail with reference to FIG. 7.

The shutter button 171 is a button to be pressed by the photographer when recording a captured image. When the photographer performs a normal image capturing operation (so-called photo shooting) by using the image capturing apparatus 100, the photographer presses the shutter button 171 after checking an image of a subject displayed on the liquid crystal panel 181. When the shutter button 171 is pressed, a signal in accordance with pressing of the shutter button 171 is supplied to the system control unit 120. When the signal in accordance with pressing of the shutter button 171 is supplied, the system control unit 120 records in the recording unit 150 a captured image obtained at the time the signal in accordance with pressing of the shutter button 171 has been pressed. When the specified-target-object automatic image capturing mode has been set, if the shutter button 171 is pressed, the system control unit 120 gives an instruction to start an operation of detecting a specified target object to the camera control unit 200.

Figure 4:
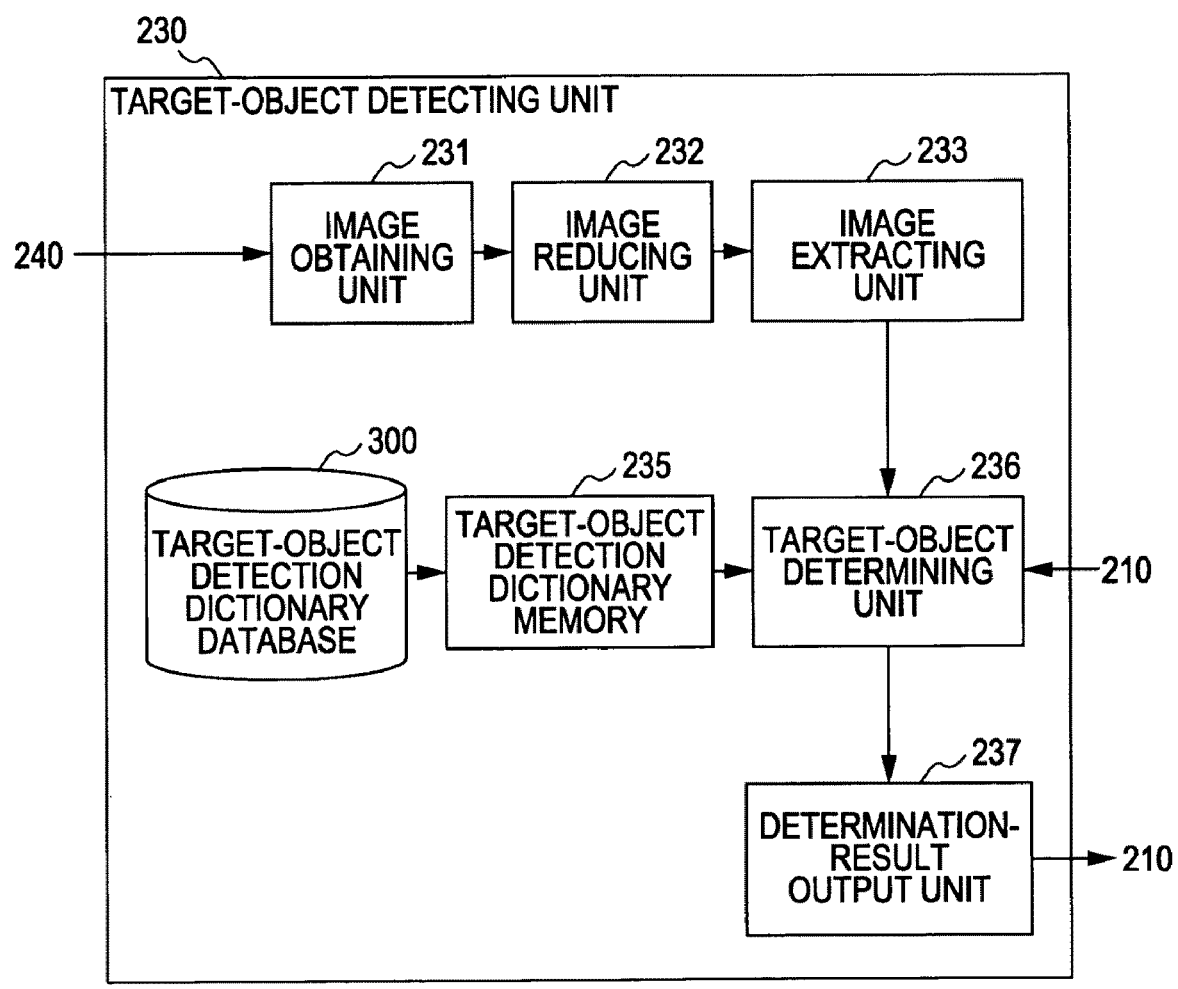
FIG. 4 is a block diagram showing an exemplary functional structure of a target-object detecting unit according to the embodiment of the present invention.

FIG. 4 is a block diagram showing an exemplary functional structure of the target-object detecting unit 230 according to the embodiment of the present invention. The target-object detecting unit 230 includes an image obtaining unit 231, an image reducing unit 232, an image extracting unit 233, a target-object detection dictionary database 300, a target-object detection dictionary memory 235, a target-object determining unit 236, and a determination-result output unit 237.

The image obtaining unit 231 obtains a captured image stored in the storage unit 130 via the storage unit I/F 240 and outputs the obtained captured image to the image reducing unit 232.

The image reducing unit 232 generates a plurality of images of different sizes by sequentially reducing the captured image output from the image obtaining unit 231 at a predetermined ratio and sequentially outputs generated images to the image extracting unit 233. Reduction of the captured image will be described in detail with reference to FIG. 9.

The image extracting unit 233 sequentially extracts an image within a predetermined area from each of the images output from the image reducing unit 232 on an image-by-image basis and outputs the extracted image to the target-object determining unit 236. Extraction of the image will be described in detail with reference to FIGS. 8 and 9.

The target-object detection dictionary database 300 is a database that stores a plurality of target-object detection dictionaries for performing a target-object determination process using the target-object determining unit 236 on an image output from the image extracting unit 233. The stored target-object detection dictionaries are sequentially supplied to the target-object detection dictionary memory 235. These target-object detection dictionaries will be described in detail with reference to FIG. 5.

The target-object detection dictionary memory 235 is a working memory that stores one target-object detection dictionary among the target-object detection dictionaries stored in the target-object detection dictionary database 300. The target-object detection dictionary memory 235 supplies the details of the stored target-object detection dictionary to the target-object determining unit 236.

The target-object determining unit 236 performs a target-object determination process of determining whether an image output from the image extracting unit 233 includes a target object using the target-object detection dictionary(ies) stored in the target-object detection dictionary database 300. The target-object determining unit 236 outputs the determination result to the determination-result output unit 237. As the determination result, for example, the position and the size of the detected target object in the captured image and a score indicating the degree of the target object are output. In the target-object determination process, a target object specified by the user using the operation input unit 170 is indicated by the sequence control unit 210, and a target-object detection dictionary(ies) regarding the target object(s) specified by the user is(are) used. Among the target-object detection dictionaries stored in the target-object detection dictionary database 300, specified target-object detection dictionaries are sequentially supplied to the target-object detection dictionary memory 235. In the object detection dictionary memory 235, one target-object detection dictionary is stored at a time. Using one target-object detection dictionary stored in the target-object detection dictionary memory 235, a target-object determination process is sequentially performed. Specifically, the target-object determining unit 236 extracts luminance values in an image output from the image extracting unit 233 and performs a target-object determination process using the extracted luminance values and the target-object detection dictionary. The target-object determination process performed by the target-object determining unit 236 will be described in detail with reference to FIGS. 10A to 10C.

When the determination result output from the target-object determining unit 236 indicates that the image output from the image extracting unit 233 includes the target object, the determination-result output unit 237 outputs target-object detection information indicating that the target object has been detected in the captured image to the sequence control unit 210. The target-object detection information includes, for example, the position and the size of the detected target object in the captured image and a score indicating the degree of the target object.

Figure 5:
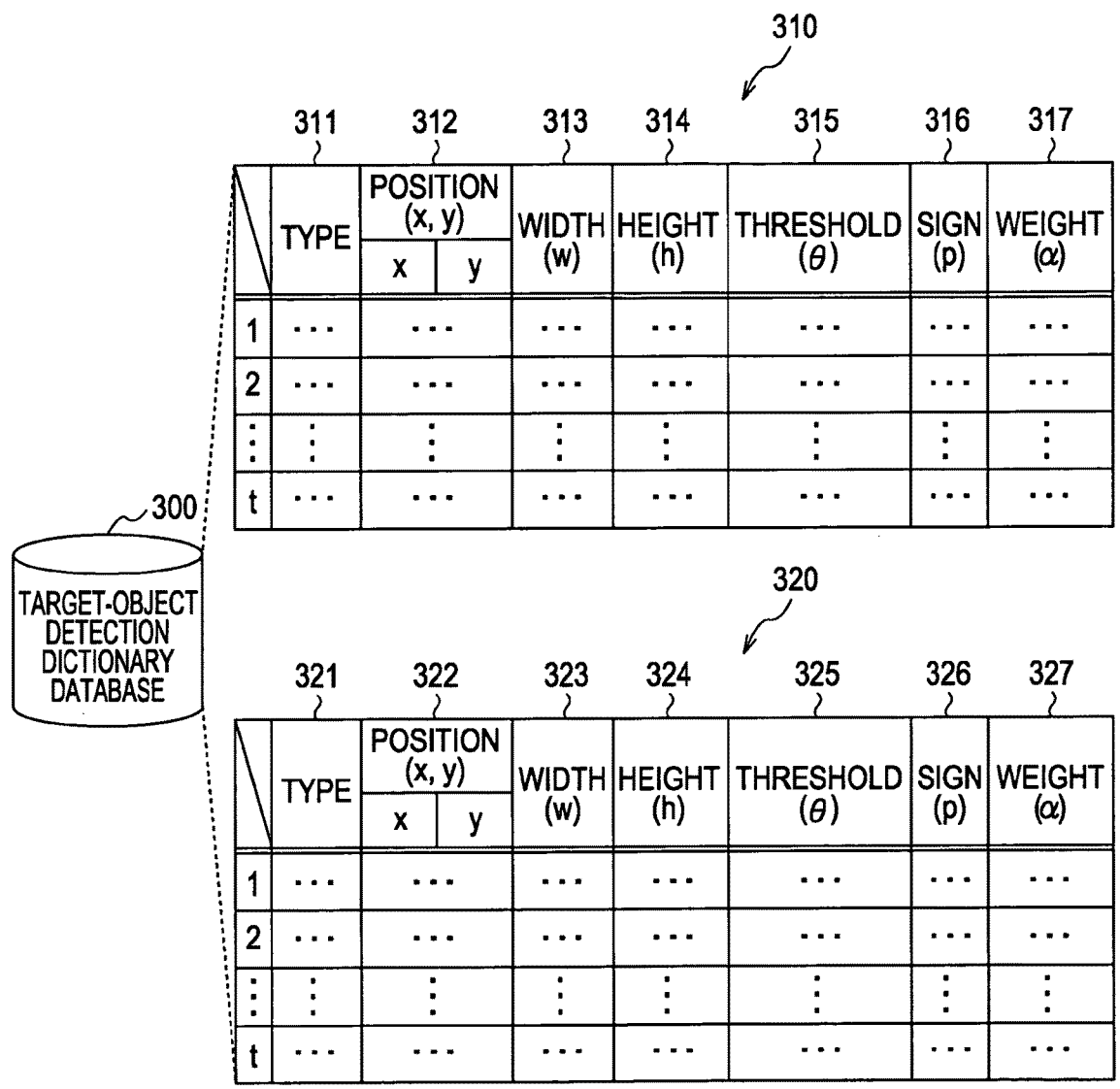
FIG. 5 includes diagrams schematically showing target-object detection dictionaries stored in a target-object detection dictionary database according to the embodiment of the present invention.

FIG. 5 includes diagrams schematically showing target-object detection dictionaries stored in the target-object detection dictionary database 300 according to the embodiment of the present invention. The following description concerns the case where, for example, a dog's face and a cat's face are to be detected as target objects. FIG. 5 shows examples of target-object detection dictionaries, namely, a dog detection dictionary 310 for determining whether an image extracted by the image extracting unit 233 includes a dog's face, and a cat detection dictionary 320 for determining whether an image extracted by the image extracting unit 233 includes a cat's face. These target-object detection dictionaries are items of determination information for the target-object determining unit 236 to perform a target-object determination process using rectangle features on an image extracted by the image extracting unit 233. The following description mainly concerns the dog detection dictionary 310. However, the same applies to the cat detection dictionary 320 except for the point that the values stored in individual items of the cat detection dictionary 320 are different.

In the dog detection dictionary 310, t combinations of a type 311, a position (x, y) 312, a width (w) 313, a height (h) 314, a threshold (θ) 315, a sign (p) 316, and a weight (α) 317 are stored.

In the type 311, the type of rectangle feature used in a target-object determination process is stored. A rectangle feature is constituted of two rectangles adjacent to each other. With the position 312, the position of the rectangle feature is determined. With the width 313 and the height 314, the size of the rectangle feature is determined. Rectangle features will be described in detail with reference to FIGS. 10A to 10C.

In the position 312, the position of a rectangle feature in an image being determined is stored. In the position 312, for example, the coordinate point (x, y) of a rectangle feature in an image extracted by the image extracting unit 233 in the case where the extracted image is in the x-y coordinate (plane coordinate) system is stored.

In the width 313, the value of the width of a rectangle feature in an image being determined is stored.

In the height 314, the value of the height of a rectangle feature in an image being determined is stored.

In the threshold 315, a threshold regarding a difference value between the sum of luminance values of pixels included in one of two rectangles constituting a rectangle feature and the sum of luminance values of pixels included in the other rectangle is stored.

In the sign 316, a value ("1" or "−1") used in obtaining a weak learner h(i) used to calculate a score indicating the degree of a target object is stored.

In the weight 317, a weight used to calculate a score indicating the degree of a target object is stored. Calculation of a score indicating the degree of a target object, which is performed using these values, will be described in detail with reference to FIGS. 10A to 10C.

These values are set using the top 1000 to 2000 most effective combinations among combinations learned using a machine learning algorithm, such as AdaBoost. In this manner, since the target-object detection dictionaries are in the same format, a plurality of determination processes can be performed using one algorithm. A target-object detection dictionary used in a determination process is determination information that holds data regarding a determination criterion for determining whether an image being determined includes a target object and that does not hold the image as such. Therefore, the storage capacity can be reduced, and a determination process can be quickly performed.

FIG. 6 is a diagram schematically showing the details stored in the audio storage unit 160 according to the embodiment of the present invention. In the audio storage unit 160, a target object 161 and audio information 162 are stored in association with each other.

The target object 161 is a target object that can be specified as a target object of which an image is to be automatically captured. For example, a "dog" or a "cat" is stored as the target object 161.

The audio information 162 is audio information for outputting sound from the audio output unit 190. Referring to FIG. 6, audio information stored in association with a "dog" is represented as "bow-wow", and audio information stored in association with a "cat" is represented as "meow-meow". For example, when a target object stored in the target object 161 is detected by the target-object detecting unit 230, sound corresponding to audio information stored in association with the detected target object is output from the audio output unit 190.

Figure 7:
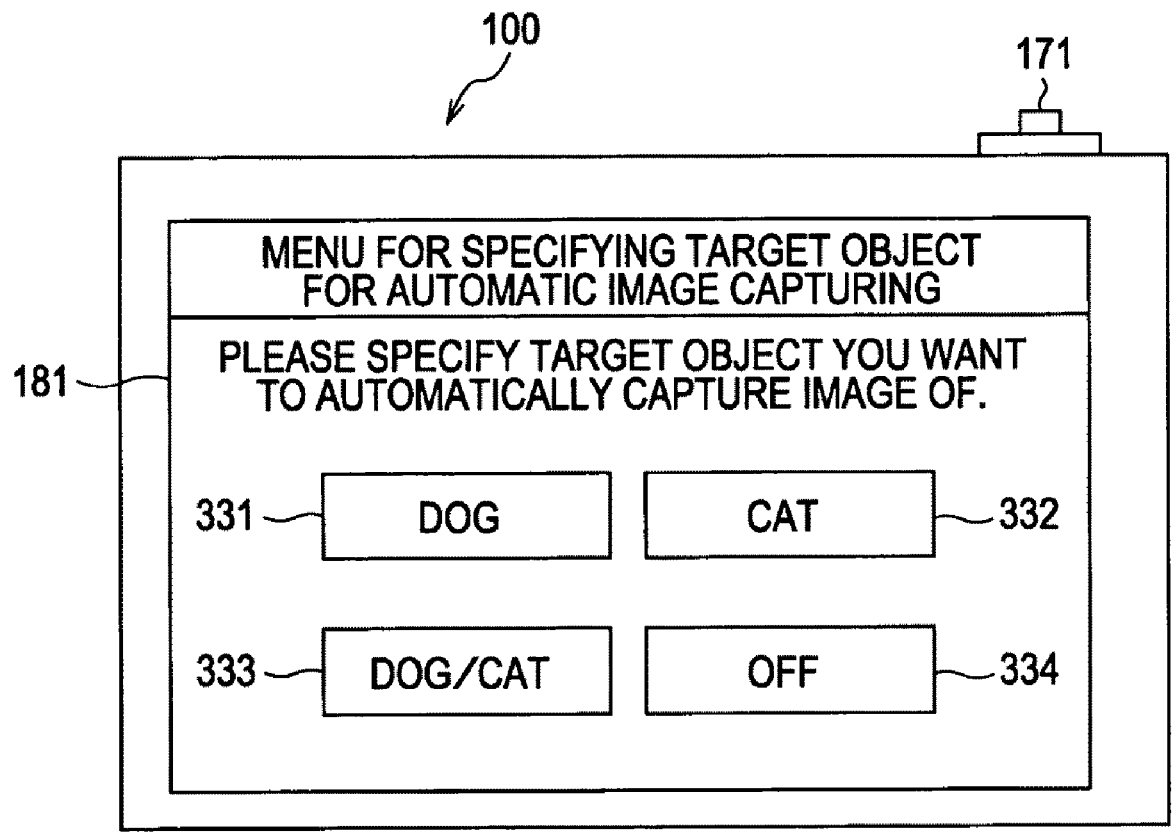
FIG. 7 is a diagram showing an example of a menu screen displayed on a liquid crystal panel according to the embodiment of the present invention.

FIG. 7 is a diagram showing an example of a menu screen displayed on the liquid crystal panel 181 according to the embodiment of the present invention. A "menu for specifying a target object for automatic image capturing" screen is a menu screen for specifying a target object of which an image is to be automatically captured. This menu screen includes a "dog" specifying button 331, a "cat" specifying button 332, a "dog/cat" specifying button 333, and an "OFF" specifying button 334.

The "dog" specifying button 331 is a button pressed when specifying a dog as a target object of which an image is to be automatically captured. The "cat" specifying button 332 is a button pressed when specifying a cat as a target object of which an image is to be automatically captured. The "dog/cat" specifying button 333 is a button pressed when specifying a dog or a cat as a target object of which an image is to be automatically captured. That is, when the "dog/cat" specifying button 333 is pressed, automatic image capturing is performed when a dog or a cat is detected in a captured image. The "OFF" specifying button 334 is a button pressed when turning off the "menu for specifying a target object for automatic image capturing" screen shown in FIG. 7.

In this embodiment of the present invention, while the "menu for specifying a target object for automatic image capturing" screen shown in FIG. 7 is being displayed on the liquid crystal panel 181, when the user performs a selection operation of pressing one of the "dog" specifying button 331, the "cat" specifying button 332, and the "dog/cat" specifying button 333, a specified-target-object automatic image capturing mode is set in which an image of a target object in accordance with the specifying button that has been pressed is to be automatically captured. When the specified-target-object automatic image capturing mode has been set, if the user presses the shutter button 171, an operation of detecting the specified target object starts. When the specified target object is detected in a captured image, sound regarding the detected target object is output, and a captured image is recorded. That is, capturing an image including the specified target object is automatically performed.

Next, a target-object detecting method of detecting a target object will now be described in detail with reference to the drawings.

FIG. 8 includes diagrams showing the outline of the image extracting method of extracting an image on which the target-object determination process is to be performed by the target-object determining unit 236 according to the embodiment of the present invention. Part (a) of FIG. 8 shows an image 400 whose size has been reduced by the image reducing unit 232. Part (b) of FIG. 8 shows the outline of an image extracting method performed in the case where an image on which a target-object determination process is to be performed is extracted from the image 400. Extracting this image is performed by the image extracting unit 233.

The image 400 shown in part (a) of FIG. 8 is an image obtained by reducing a captured image of a dog serving as a subject, which lies on the grass with a mountain behind it. In order to extract from this image 400 an image on which a target-object determination process is to be performed, as shown in part (b) of FIG. 8, an extracting frame 401 is placed in the upper left-hand corner of the image 400, and an image included within the extracting frame 401 is extracted. Thereafter, the extracting frame 401 is shifted by one pixel in the rightward direction (direction indicated by arrows 411 to 416), and an image included within the extracting frame 401 is extracted. Similarly, the extracting frame is sequentially shifted one pixel at a time in the rightward direction, and an image included within the extracting frame is sequentially extracted. When the extracting frame is shifted to the position of an extracting frame 402, which is at the right edge of the image 400, and an image included within the extracting frame 402 is extracted, the extracting frame is shifted downward by one pixel and then moved to the left edge of the image 400. Then, after an image included within the extracting frame, which was just moved to the left edge of the image 400, is extracted, the extracting frame is sequentially shifted one pixel at a time in the rightward direction, and an image included within the extracting frame is sequentially extracted. From this point onward, an image included within the extracting frame is sequentially extracted. When the extracting frame is shifted to the position of an extracting frame 404, which is at the lower right edge of the image 400, and an image included within the extracting frame 404 is extracted, the process of extracting from the image 400 an image on which a target-object determination process is to be performed is ended.

Figure 9:
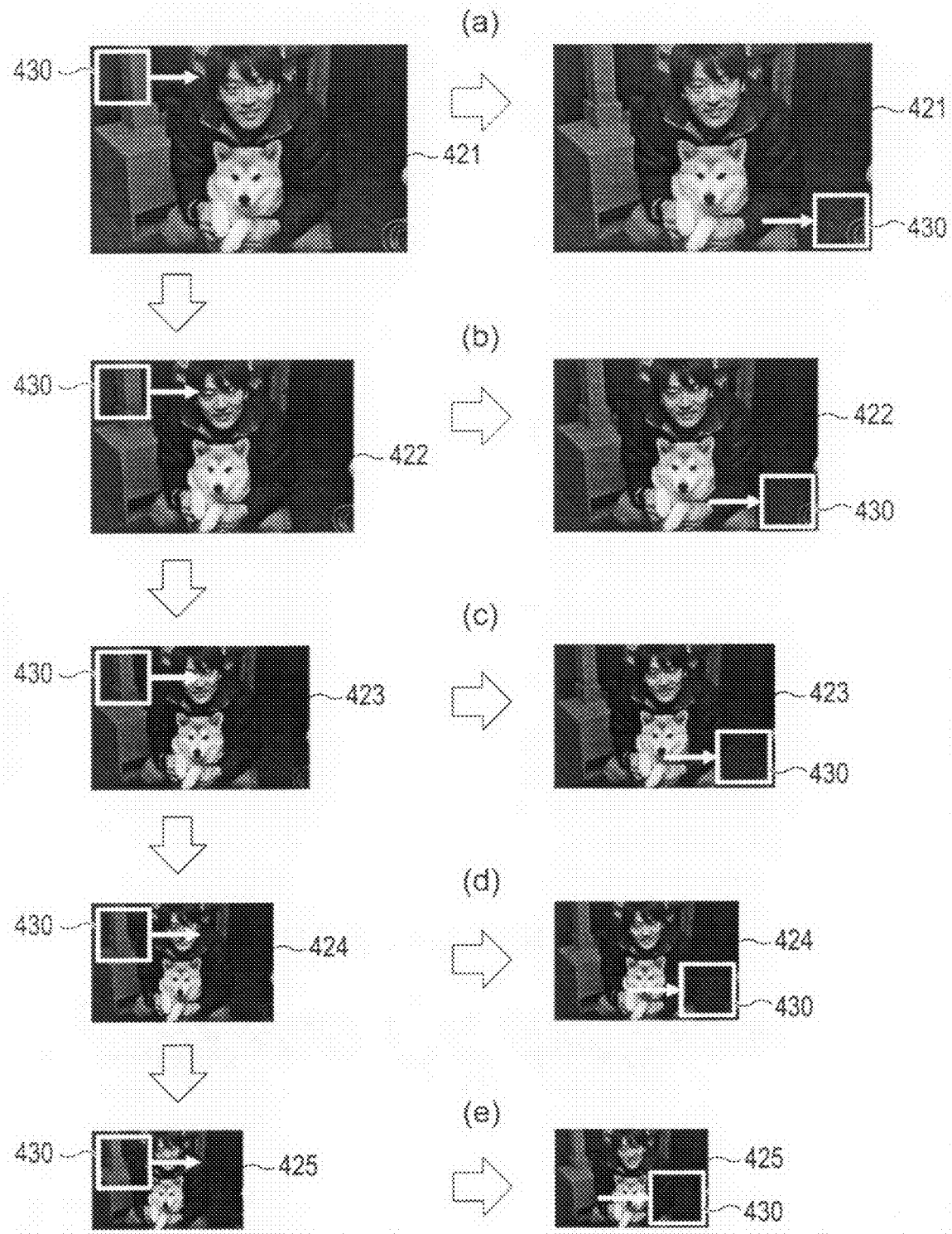
FIG. 9 includes diagrams showing the outline of the image extracting method of extracting an image to be determined in the target-object determination process performed by the target-object determining unit according to the embodiment of the present invention.

FIG. 9 includes diagrams showing the outline of an image extracting method of extracting an image on which a target-object determination process is to be performed by the target-object determining unit 236 according to the embodiment of the present invention. Parts (a) to (e) of FIG. 9 show images 421 to 425 that are sequentially obtained by performing a reduction process using the image reducing unit 232. Of parts (a) to (e) of FIG. 9, images on the left side show the first positions at which an extracting frame 430 is placed, and images on the right side show the last positions at which the extracting frame 430 is placed. Movement of the extracting frame 430 from the first position to the last position is similar to that shown in part (b) of FIG. 8. As shown in FIG. 9, the size of the extracting frame 430 is constant regardless of the size of an image from which an image is to be extracted. An image extracting process is performed until the size of an image obtained by performing a reduction process using the image reducing unit 232 becomes smaller than the extracting frame 430.

An example of performing a determination process on an image being determined using a target-object detection dictionary will be described in detail with reference to the drawings.

Figure 10A:
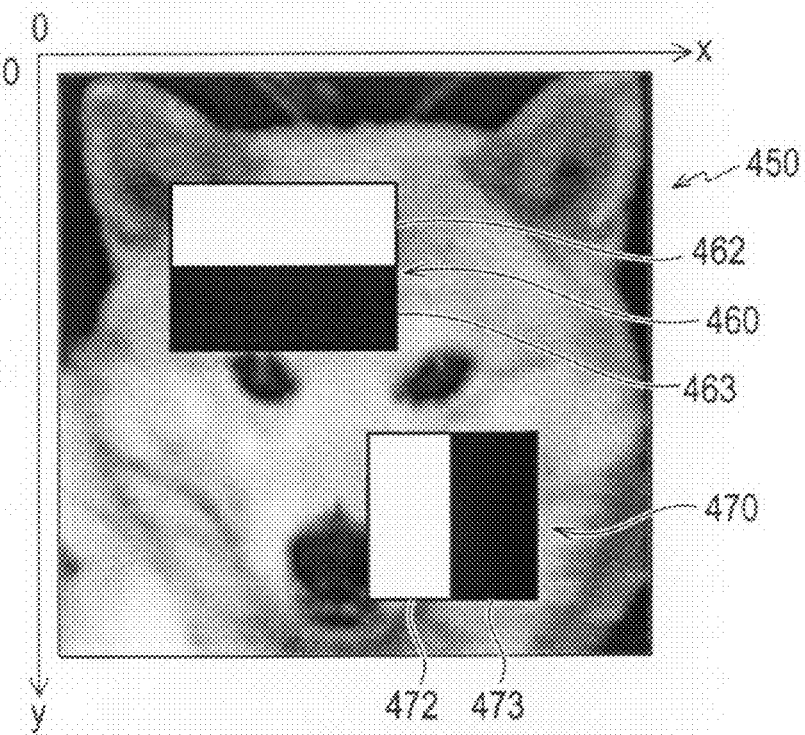
FIG. 10A is a diagram showing an image being determined according to the embodiment of the present invention.
Figure 10B:
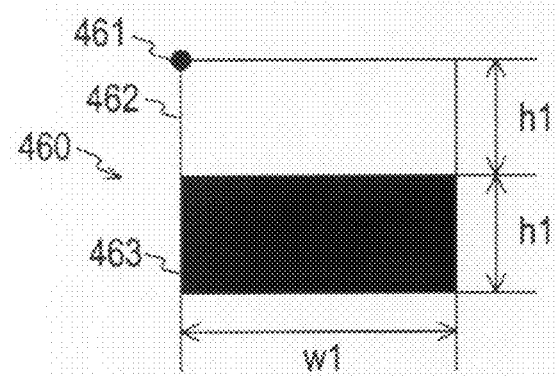
FIGS. 10B and 10C are diagrams showing rectangle features used in a determination process.
Figure 10C:
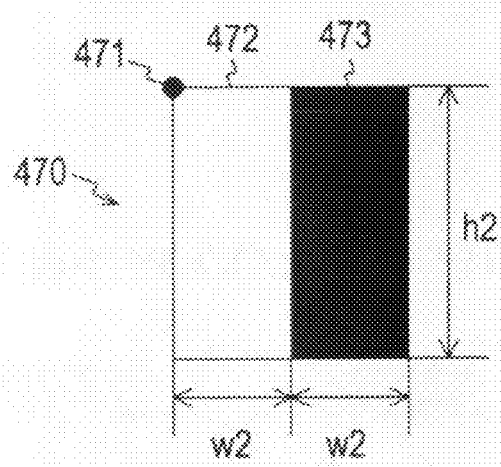

FIG. 10A is a diagram showing an image being determined according to the embodiment of the present invention, and FIGS. 10B and 10C are diagrams showing rectangle features used in a determination process. FIG. 10A shows an image being determined 450, which is extracted by the image extracting unit 233 and is to be determined. FIGS. 10B and 10C show two types of rectangle features used in a determination process. In this example, the upper left-hand corner of the image being determined 450 shown in FIG. 10A serves as the origin, and the horizontal and vertical directions serve as the x-axis and the y-axis, respectively. The case where a determination process is performed on the image being determined 450 using the dog detection dictionary 310 (shown in FIG. 5) will be described. In this determination process, an example where two types of rectangle features shown in FIGS. 10B and 10C, respectively, are used will be described.

The image being determined 450 shown in FIG. 10A is an image extracted by the image extracting unit 233 from an image obtained by reducing, using the image reducing unit 232, a captured image generated by the image pickup unit 112. The image being determined 450 is an image normalized with a predetermined resolution. In this example, the captured image generated by the image pickup unit 112 has a resolution of, for example, 320 pixels×240 pixels. In this case, as a normalization process, for example, a normalization process of converting this image to an image with a resolution of 48 pixels×48 pixels is performed. Rectangle features 460 and 470 arranged on the image being determined 450 correspond to the rectangle features 460 and 470 shown in FIGS. 10B and 10C, respectively.

The rectangle features 460 and 470 shown in FIGS. 10B and 10C, respectively, are rectangle features each constituted of two rectangles that are adjacent to each other (two rectangles, one in black and the other in white). These rectangle features 460 and 470 are arranged on the image being determined 450, and determination is made on the image being determined 450 on the basis of a difference value between luminance values included in the two rectangle areas.

Specifically, the types of the rectangle features 460 and 470 used in making determination are stored in the type 311 of the dog detection dictionary 310. In addition, positions at which the rectangle features 460 and 470 are to be arranged on the image being determined 450 are stored in the position 312 of the dog detection dictionary 310. That is, when the rectangle feature 460 is to be arranged on the image being determined 450, the rectangle feature 460 is arranged so that a point 461 in the upper left-hand corner of the rectangle feature 460 is at the position of the coordinate point (x, y), which is stored in the position 312 of the dog detection dictionary 310. The same applies to the rectangle feature 470. That is, the rectangle feature 470 is arranged on the image being determined 450 so that a point 471 in the upper left-hand corner of the rectangle feature 470 is at the position of the coordinate point (x, y), which is stored in the position 312 of the dog detection dictionary 310.

The sizes of the rectangle features 460 and 470 are determined on the basis of the values stored in the width 313 and the height 314 of the dog detection dictionary 310. That is, it is assumed that the width w1 of the rectangle feature 460 is a value stored in the width 313 of the dog detection dictionary 310, and the height h1 of the rectangle feature 460 is a value stored in the height 314 of the dog detection dictionary 310. The same applies to the rectangle feature 470. That is, it is assumed that the width w2 of the rectangle feature 470 is a value stored in the width 313 of the dog detection dictionary 310, and the height h2 of the rectangle feature 460 is a value stored in the height 314 of the dog detection dictionary 310.

In this manner, for such a rectangle feature whose position and size in the image being determined 450 have been determined, the sum of luminance values of pixels included in each of two rectangles constituting the rectangle feature is calculated, and the difference value between the sums of the luminance values calculated from the two rectangles is calculated as a feature amount F(i) where i is a value indicating a record in the dog detection dictionary 310, and $1 \leq i \leq t$. The feature amount F(i) is compared with a threshold θ(i) stored in the threshold 315 of the dog detection dictionary 310, and a weak learner h(i) is calculated in accordance with whether the feature amount F(i) is less than the threshold θ(i) and a value p(i) stored in the sign 316 (the value p(i) is 1 or −1). Specifically, the weak leaner h(i) is calculated using the following:

(1) When the value p(i)=1:
if the feature amount F(i)<the threshold θ(i), then the weak learner h(i)=1; and
if the feature amount F(i)≧the threshold θ(i), then the weak learner h(i)=−1, and (2) When the value p(i)=−1:
if the feature amount F(i)<the threshold θ(i), then the weak learner h(i)=−1; and
if the feature amount F(i)≧the threshold θ(i), then the weak learner h(i)=1.

Thereafter, h(i)α(i) is calculated by multiplying the calculated weak learner h(i) by a value α(i) stored in the weight 317. These calculations are repeatedly performed from the first line to the t-th line of the dog detection dictionary 310, and the sum of h(i)α(i) is calculated as a score S. Specifically, the score S is calculated using the following:

$$S = \sum_{i=1}^{t} h(i) \cdot \alpha(i) \quad (1)$$

On the basis of the score S calculated using equation (1), it is determined whether a dog's front face is included in the image being determined 450. Specifically, if the score S≧0, then it is determined that the image being determined 450 includes a dog's front face. In contrast, if the score S<0, then it is determined that the image being determined 450 does not include a dog's front face.

Next, a specific calculation method will be described.

For example, it is assumed that a rectangle feature determined on the basis of values stored in the first line of the dog detection dictionary 310 is the rectangle feature 460 shown in FIG. 10A. That is, the type of rectangle feature stored in the type 311 in the first line of the dog detection dictionary 310 is the rectangle feature 460 shown in FIG. 10B. On the basis of values stored in the position 312, the width 313, and the height 314 in the first line of the dog detection dictionary 310, the position and size of the rectangle feature 460 shown in FIG. 10A are determined. Similarly, it is assumed that a rectangle feature determined on the basis of values stored in the second line of the dog detection dictionary 310 is the rectangle feature 470 shown in FIG. 10A. That is, the type of rectangle feature stored in the type 311 in the second line of the dog detection dictionary 310 is the rectangle feature 470 shown in FIG. 10C. On the basis of values stored in the position 312, the width 313, and the height 314 in the second line of the dog detection dictionary 310, the position and size of the rectangle feature 470 shown in FIG. 10A are determined.

Firstly, the score S for making determination is set to 0, and operations using the values stored in the first line of the dog detection dictionary 310 are performed. Specifically, the sum of luminance values included in each of two rectangles 462 and 463 constituting the rectangle feature 460 determined on the basis of the values stored in the type 311, the position 312, the width 313, and the height 314 in the first line of the dog detection dictionary 310 is calculated. When the sum of luminance values included in the area of the rectangle 462 is denoted by A(1), and the sum of luminance values included in the area of the rectangle 463 is denoted by B(1), the difference value between the sums calculated from the respective areas is calculated as a feature amount F(1):

$$F(1) = A(1) - B(1) \quad (2)$$

Thereafter, the calculated feature amount F(1) is compared with a threshold θ(1) stored in the threshold 315 in the first line of the dog detection dictionary 310, and a weak learner h(1) is calculated in accordance with whether the feature amount F(1) is less than the threshold θ(1) and a value p(1) stored in the sign 316 in the first line of the dog detection dictionary 310. The weak learner h(1) is calculated using the above-described equation.

Thereafter, h(1)α(1) is calculated by multiplying the calculated weak learner h(1) by a value α(1) stored in the weight 317 in the first line of the dog detection dictionary 310. The calculated h(1)α(1) is added to the score S.

Thereafter, the above-described operations are repeated using the values stored in the second line of the dog detection dictionary 310. Specifically, for two rectangles 472 and 473 constituting the rectangle feature 470 determined on the basis of the values stored in the type 311, the position 312, the width 313, and the height 314 in the second line of the dog detection dictionary 310, the sum A(2) of luminance values included in the area of the rectangle 472 and the sum B(2) of luminance values included in the area of the rectangle 473 are calculated, and a feature amount F(2) is calculated using the following equation:

$$F(2) = A(2) - B(2) \quad (3)$$

Thereafter, the calculated feature amount F(2) is compared with a threshold θ(2) stored in the threshold 315 in the second line of the dog detection dictionary 310, and a weak learner h(2) is calculated in accordance with whether the feature amount F(2) is less than the threshold θ(2) and a value p(2) stored in the sign 316 in the second line of the dog detection dictionary 310.

Thereafter, h(2)α(2) is calculated by multiplying the calculated weak learner h(2) by a value α(2) stored in the weight 317 in the second line of the dog detection dictionary 310. The calculated h(2)α(2) is added to the score S.

Thereafter, the above-described operations are repeated using the values stored in the third line to the t-th line of the dog detection dictionary 310. After the operations using the values stored in the t-th line of the dog detection dictionary 310 are completed, it is determined whether the value of the score S is greater than or equal to zero.

For example, when positive samples obtained by performing learning using the above-described machine learning algorithm show that a dog's face has been successfully detected and negative samples show that no dog's face has been detected, if the value of the score S after the operations using the values stored in the first to t-th lines of the dog detection dictionary 310 are completed is greater than or equal to zero, it is determined that the image being determined includes a dog's face. The same applies to other target-object detection dictionaries. For example, when positive samples obtained by making determination using the cat detection dictionary 320 show that a cat's face has been successfully detected, if the value of the score S is greater than or equal to zero, it is determined that the image being determined includes a cat.

In this embodiment of the present invention, an example in which the score is compared with zero is described as determination using a target-object detection dictionary. However, determination may be made using a value other than zero. That is, a value compared with the score S can be appropriately adjusted.

By adjusting images being determined to have the same resolution and by using specific types of rectangle features used to make determination, a plurality of target-object detection dictionaries can be used at a time, and a plurality of target objects can be determined using the same algorithm. In this example, the case where one of two types of rectangle features is used has been described. However, the embodiment of the present invention is applicable to the case where one type or three or more types of rectangle features are used.

FIG. 11 includes diagrams showing an example of a captured image displayed on the liquid crystal panel 181 according to the embodiment of the present invention. A captured image 480 shown in FIG. 11 is an image corresponding to the images 421 to 425 shown in FIG. 9. Part (a) of FIG. 11 shows the captured image 480 prior to a dog detecting process performed by the target-object detecting unit 230, and part (b) of FIG. 11 shows the captured image 480 subsequent to a dog detecting process performed by the target-object detecting unit 230. When a dog is detected in the captured image 480 displayed on the liquid crystal panel 181, as shown in part (b) of FIG. 11, a marker 481 is placed at the position of the detected dog's face.

Next, recording of a captured image in the case where the specified-target-object automatic image capturing mode has been set will be described in detail with reference to the drawings.

Figure 12A:
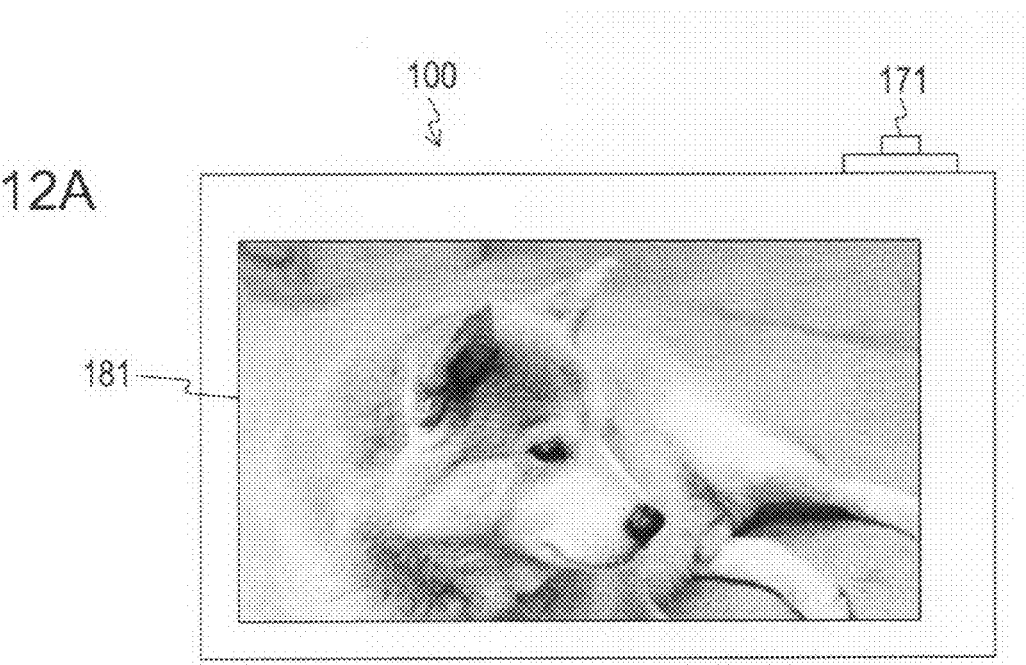
FIGS. 12A and 12B are diagrams showing display examples of the liquid crystal panel when an image of a dog is captured using the image capturing apparatus according to the embodiment of the present invention.
Figure 12B:
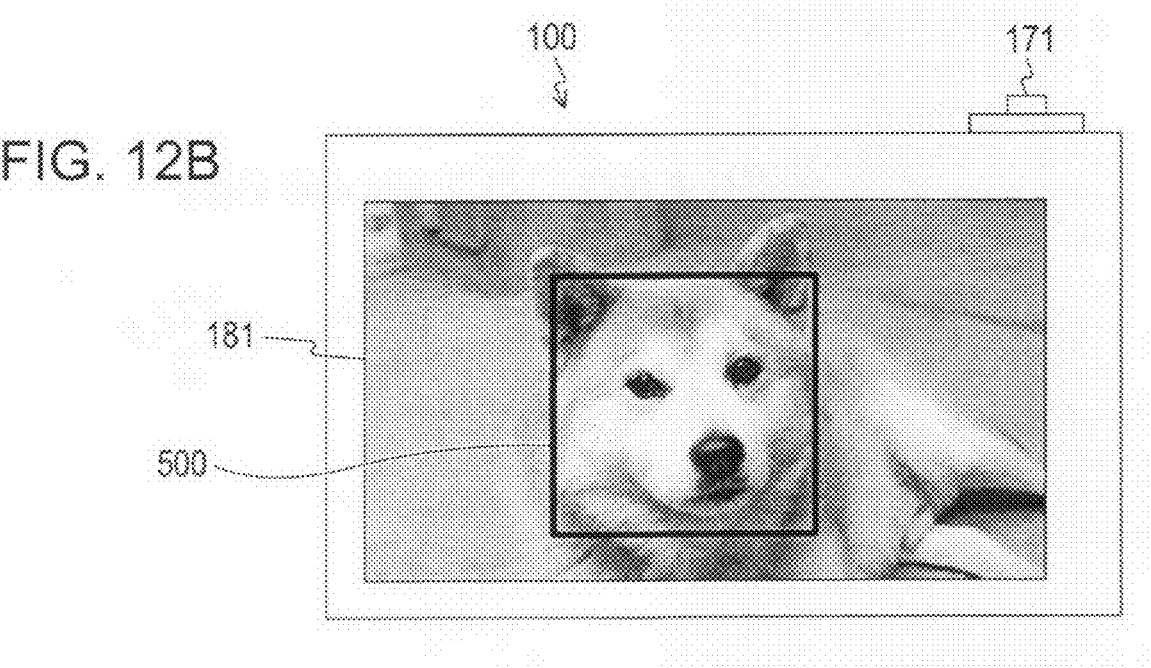

FIGS. 12A and 12B are diagrams showing display examples of the liquid crystal panel 181 when an image of a dog is captured using the image capturing apparatus 100 according to the embodiment of the present invention. FIG. 12A shows a state in which the liquid crystal panel 181 displays an image of a dog that does not look toward the lens 111 of the image capturing apparatus 100. FIG. 12B shows a state in which the liquid crystal panel 181 displays an image of the dog which looks toward the lens 111 of the image capturing apparatus 100. In the case shown in FIG. 12B, the captured image includes the front side of the dog's face. Therefore, a marker 500 is placed around the dog's face detected in the captured image, and the captured image is recorded.

In this embodiment of the present invention, when a dog's face is detected in a captured image and the captured image is recorded, the sound "bow-wow" corresponding to audio information stored in association with a dog in the audio storage unit 160 is output from the audio output unit 190, thereby causing the dog to further look toward the lens 111. For example, in a state where the specified-target-object automatic image capturing mode is set by pressing by the user the "dog" specifying button 331 on the "menu for specifying a target object for automatic image capturing" screen shown in FIG. 7, if the shutter button 171 is pressed, the sound "bow-wow" corresponding to audio information stored in association with a dog in the audio storage unit 160 is output from the audio output unit 190. In addition, the sound "bow-wow" corresponding to the audio information can be output from the audio output unit 190 at the time a dog is detected in a captured image, and the captured image is recorded. Recording of the captured image will be described in detail with reference to FIGS. 13 and 14.

Figure 13:
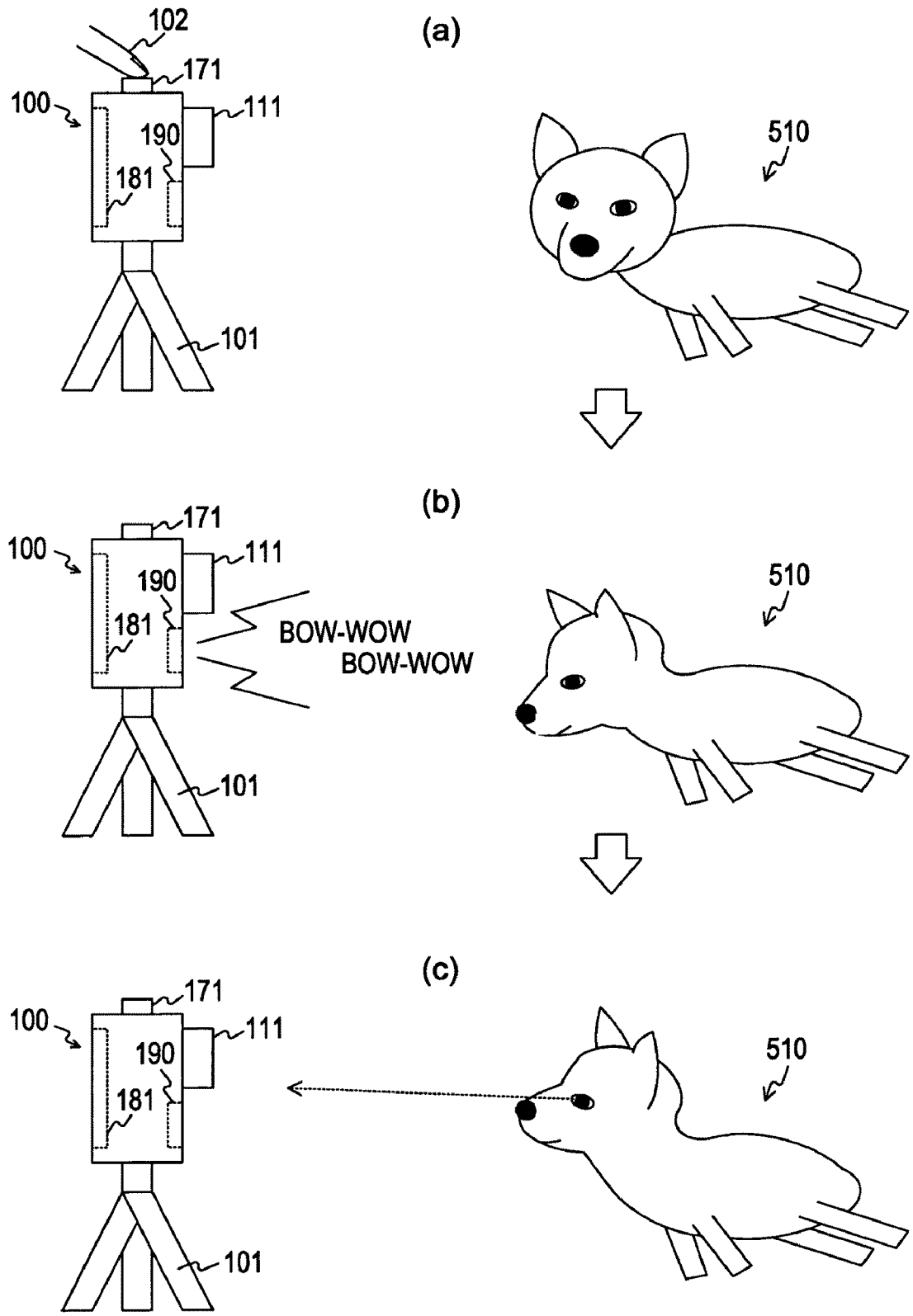
FIG. 13 includes diagrams schematically showing the case where an image of a dog is captured using the image capturing apparatus according to the embodiment of the present invention.
Figure 14:
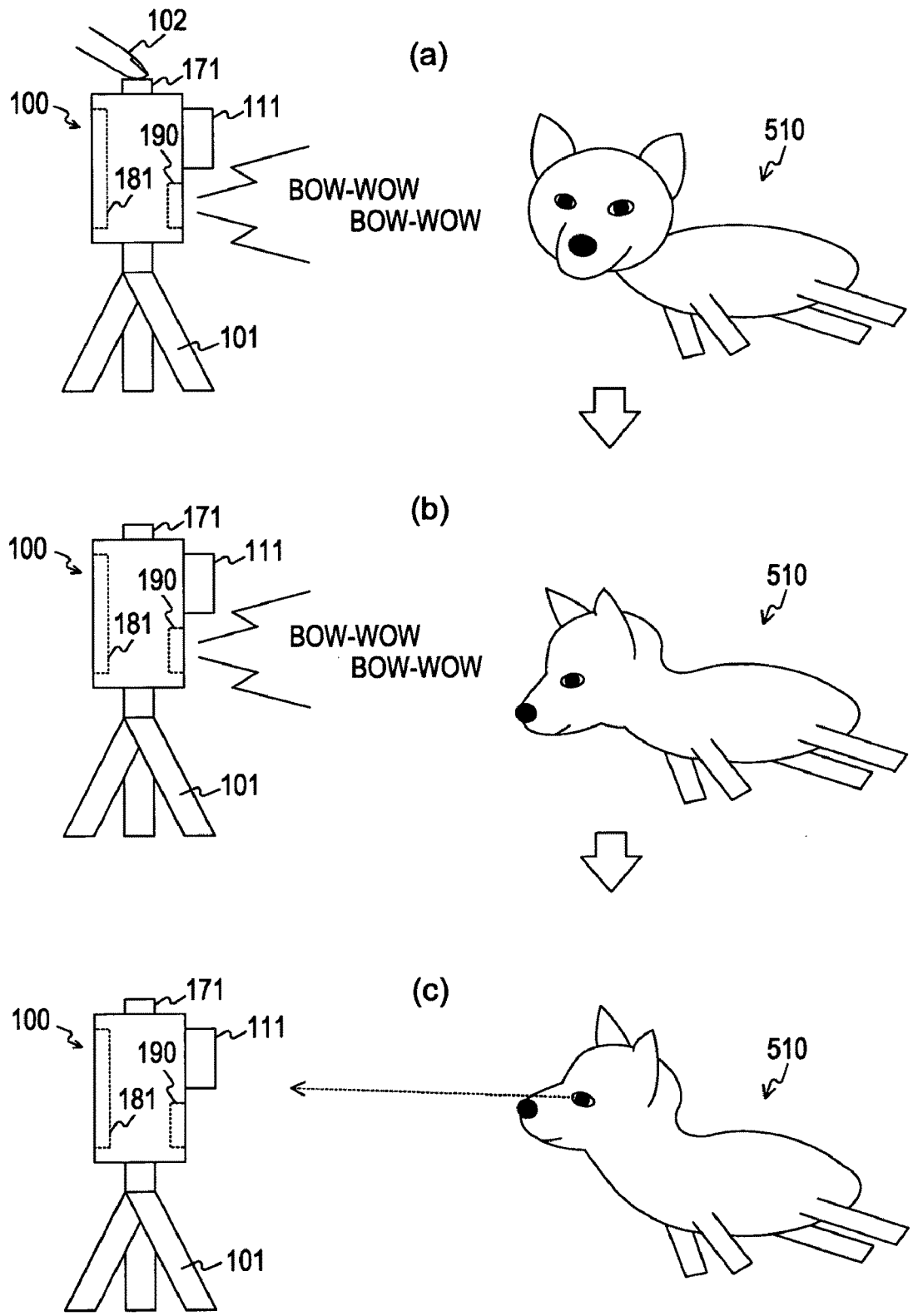
FIG. 14 includes diagrams schematically showing the case where an image of a dog is captured using the image capturing apparatus according to the embodiment of the present invention.

FIGS. 13 and 14 include diagrams schematically showing the case where an image of a dog is captured using the image capturing apparatus 100 according to the embodiment of the present invention. In parts (a) of FIGS. 13 and 14, in order to capture an image of a dog 510 lying on the floor, the image capturing apparatus 100 is fixed to a tripod 101 so that the image capturing apparatus 100 can be arranged facing the dog 510. However, the face of the dog 510 is not directed toward the lens 111. The following description concerns an example in which, in a state where the specified-target-object automatic image capturing mode is set by pressing by the user the "dog" specifying button 331 on the "menu for specifying a target object for automatic image capturing" screen shown in FIG. 7, the shutter button 171 is pressed by the user.

FIG. 13 shows an example in which, when the face of the dog 510 is detected, the sound "bow-wow" corresponding to audio information stored in association with a dog in the audio storage unit 160 is output from the audio output unit 190, and a captured image is recorded. That is, as shown in part (a) of FIG. 13, when the shutter button 171 is pressed by a finger 102, the target-object detecting unit 230 starts a dog detecting process of detecting a dog in a captured image. In a state where the specified-target-object automatic image capturing mode has been set, if the shutter button 171 is pressed, no captured image will be recorded until the face of the dog 510 is detected. As shown in part (b) of FIG. 13, when the face of the dog 510 is detected by the target-object detecting unit 230, the sound "bow-wow" corresponding to the audio information is output from the audio output unit 190. Subsequently, as shown in part (c) of FIG. 13, a captured image is recorded at the time the sound "bow-wow" corresponding to the audio information is output from the audio output unit 190. Outputting of the sound from the audio output unit 190 and recording of the captured image may be performed almost simultaneously. Alternatively, after a predetermined time elapses from when the sound is output from the audio output unit 190, a captured image may be recorded.

Detection of a dog's face is not necessarily so accurate as detection of a person's face. Therefore, as shown in part (b) of FIG. 13, even when the dog 510 looks toward the image capturing apparatus 100 and the face of the dog 510 is detected, the dog 510 may not necessarily face front while the eyes of the dog 510 are looking toward the lens 111. In this example, as shown in part (b) of FIG. 13, when the face of the dog 510 is detected, the sound "bow-wow" corresponding to audio information stored in association with a dog is output, thereby drawing the attention of the dog 510 to the image capturing apparatus 100. At the moment at which the face of the dog 510 is directed toward the lens 111, a captured image is recorded. Accordingly, in order to record a captured image of the front side of the face of the dog 510 which does not understand instructions given from the user, a captured image can be recorded at an appropriate timing at which the face of the dog 510 is directed toward the image capturing apparatus 100.

FIG. 14 shows an example in which, when the shutter button 171 is pressed by the finger 102 and when the face of the dog 510 is detected, the sound "bow-wow" corresponding to audio information stored in association with a dog in the audio storage unit 160 is output from the audio output unit 190. That is, as shown in part (a) of FIG. 14, when the shutter button 171 is pressed by the finger 102, the sound "bow-wow" corresponding to audio information stored in association with a specified dog in the audio storage unit 160 is output from the audio output unit 190. At the same time, the target-object detecting unit 230 starts a dog detecting process of detecting a dog in a captured image. Since this example is the same as that shown in FIG. 13 except for the point that the sound "bow-wow" corresponding to the audio information is output from the audio output unit 190 at the time the shutter button 171 is pressed, a description thereof will be omitted. Accordingly, in order to record a captured image of the front side of the face of the dog 510 which does not understand instructions given from the user, even when the face of the dog 510 is not directed toward the front, drawing the attention of the dog 510 by outputting the sound "bow-wow" corresponding to audio information associated with a dog helps direct the face of the dog 510 toward the image capturing apparatus 100. That is, by outputting the sound "bow-wow" corresponding to the audio information at two stages, a captured image can be recorded at an appropriate timing.

As shown in FIGS. 13 and 14, by outputting the sound "bow-wow" corresponding to audio information associated with a dog at the time of recording a captured image, the attention of the dog 510 can be drawn, and the user can be notified of the fact that a captured image is recorded.

Sound output at the time the shutter button 171 is pressed, which is shown in part (a) of FIG. 14, may be the same as that output at the time a dog is detected or may be output longer than that when a dog is detected. For example, the sound "bow-wow" may be repeated for a certain period of time. Alternatively, two different items of audio information regarding a dog (e.g., high "bow-wow" and low "bow-wow") may be stored in the audio storage unit 160. In this way, sound output at the time the shutter button 171 is pressed, which is shown in part (a) of FIG. 14, may be made different from that output at the time a dog is detected, which is shown in part (b) of FIG. 14. By outputting different sounds at two stages, further attention of the dog 510 can be drawn.

Now, the operation of the image capturing apparatus 100 according to the embodiment of the present invention will be described with reference to the drawings.

Figure 15:
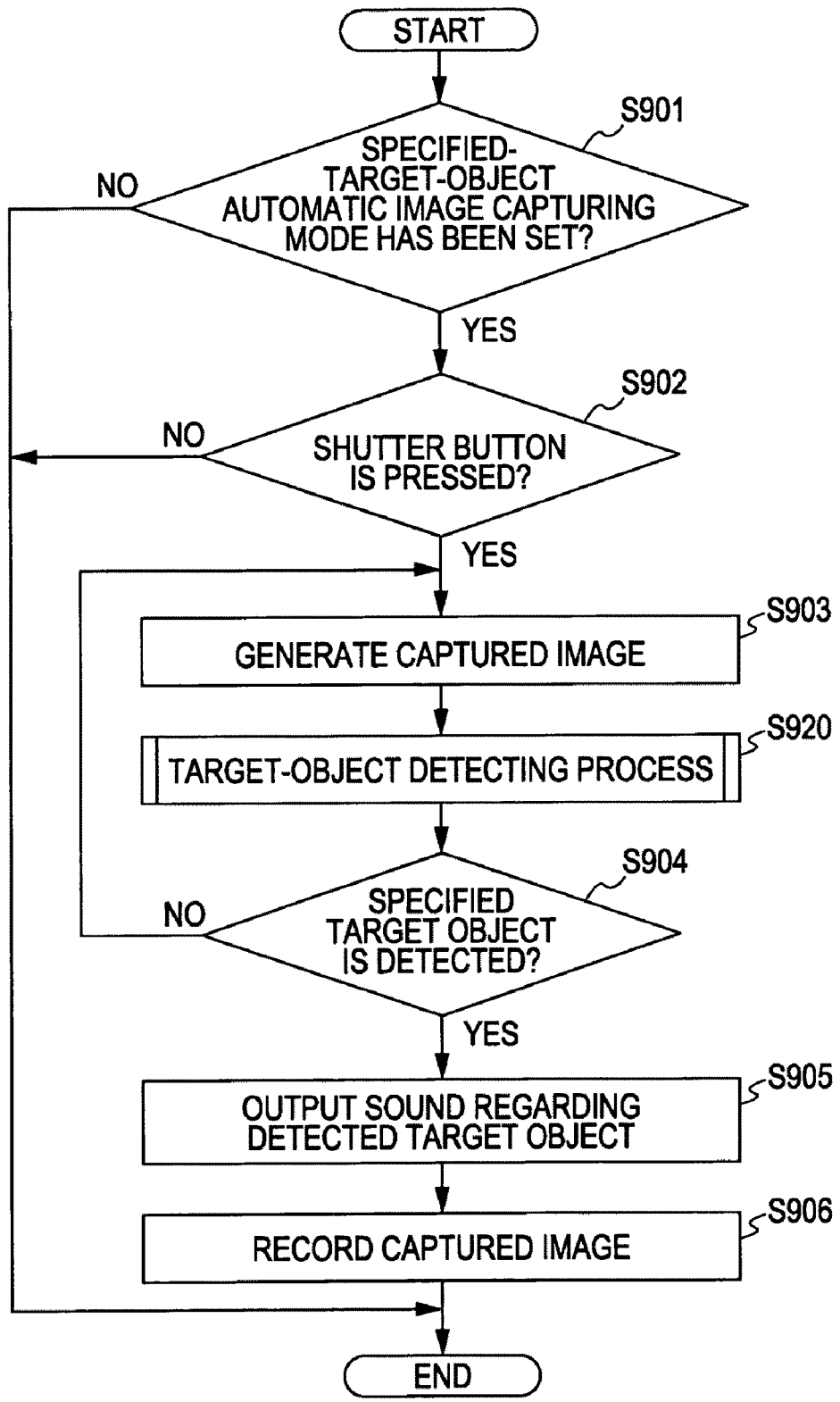
FIG. 15 is a flowchart showing the procedure of a captured-image recording process performed by the image capturing apparatus according to the embodiment of the present invention.

FIG. 15 is a flowchart showing the procedure of a captured-image recording process performed by the image capturing apparatus 100 according to the embodiment of the present invention. This procedure is to automatically record a captured image in the case where a target object specified by the user is detected.

At first, it is determined whether the specified-target-object automatic image capturing mode has been set (step S901). That is, it is determined whether, on the "menu for specifying a target object for automatic image capturing" screen shown in FIG. 7, any of the "dog" specifying button 331, the "cat" specifying button 332, and the "dog/cat" specifying button 333 has been pressed. When the specified-target-object automatic image capturing mode has been set (yes in step S901), it is determined whether the shutter button 171 is pressed (step S902). When the shutter button 171 is pressed (yes in step S902), the image pickup unit 112 starts generating a captured image (step S903), and the target-object detecting unit 230 performs a target-object detection process on the generated captured image (step S920). The target-object detection process will be described in detail with reference to FIG. 16. When the specified-target-object automatic image capturing mode has not been set (no in step S901), or when the shutter button 171 is not pressed (no in step S902), the operation of a captured image recording process is terminated.

Thereafter, it is determined whether the target-object detecting unit 230 has detected the specified target object in the captured image generated by the image pickup unit 112 (step S904). When the specified target object has been detected in the captured image generated by the image pickup unit 112 (yes in step S904), sound corresponding to audio information stored in association with the detected target object is output from the audio output unit 190 (step S905). Thereafter, the current captured image is recorded in the recording unit 150 (step S906). When the "dog/cat" specifying button 333 has been pressed on the "menu for specifying a target object for automatic image capturing" screen shown in FIG. 7, if a dog's face or a cat's face is detected by the target-object detecting unit 230, sound corresponding to audio information stored in association with the detected dog or cat is output (step S905), and the current captured image is recorded in the recording unit 150 (step S906). This example illustrates the case where, when a specified animal (dog or cat) is detected in a captured image, sound of the detected animal is output and the current captured image is recorded. Alternatively, the current captured image may be recorded at the time the specified animal is detected in the captured image, and, at the time of recording, sound of the detected animal may be output. Accordingly, the captured image can be reliably recorded at an appropriate timing which is at the moment at which the animal's face is directed toward the lens 111, and the user can be immediately notified of the fact that the captured image is recorded.

In contrast, when the target-object detecting unit 230 does not detect the specified target object in the captured image generated by the image pickup unit 112 (no in step S904), the target-object detection process is repeated (steps S903 and S920).

Figure 16:
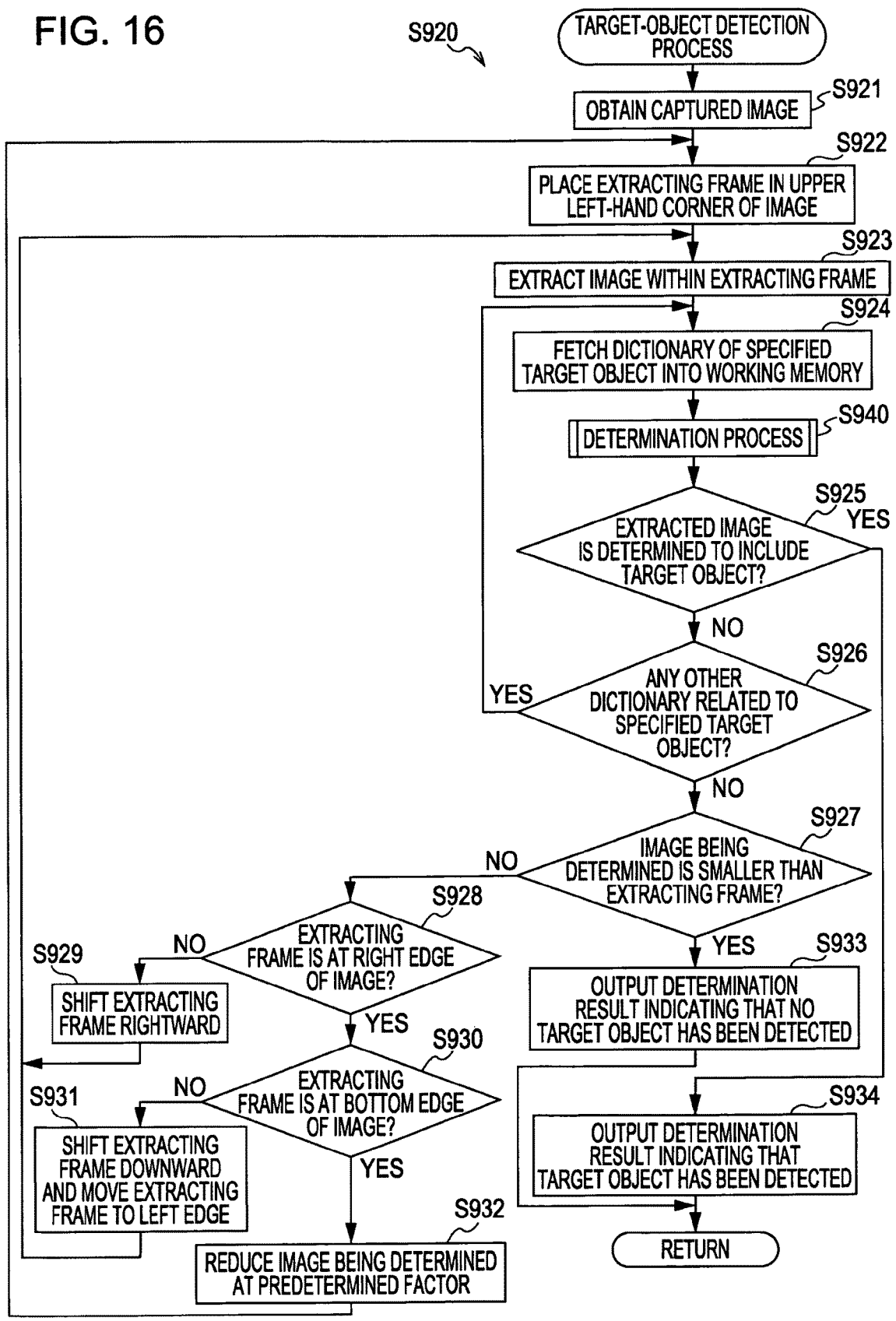
FIG. 16 is a flowchart showing the procedure of a target-object detection process, which is part of the procedure of the captured-image recording process performed by the image capturing apparatus according to the embodiment of the present invention.

FIG. 16 is a flowchart showing the procedure of the target-object detection process (procedure in step S920 shown in FIG. 15), which is part of the procedure of the captured-image recording process performed by the image capturing apparatus 100 according to the embodiment of the present invention.

At first, the current captured image stored in the storage unit 130 is obtained (step S921). Then, an extracting frame is placed in the upper left-hand corner of the obtained captured image (step S922), and an image included within the extracting frame is obtained (step S923). Then, among a plurality of target-object detection dictionaries stored in the target-object detection dictionary database 300, one target-object detection dictionary regarding the specified target object is fetched and stored in the target-object detection dictionary memory 235 (step S924). Then, using the target-object detection dictionary stored in the target-object detection dictionary memory 235, a determination process is performed on the extracted image within the extracting frame (step S940). The determination process will be described in detail with reference to FIG. 17.

Then, it is determined whether the target object is included in the extracted image within the extracting frame (step S925). When it is determined that the target object is included in the extracted image within the extracting frame (yes in step S925), target-object detection information indicating that the target object has been detected is output as a determination result (step S934). When it is not determined that the target object is included in the extracted image within the extracting frame (no in step S925), it is determined whether there is any other target-object detection dictionary regarding the specified target object among the plurality of target-object detection dictionaries stored in the target-object detection dictionary database 300 (step S926). When there is another target-object detection dictionary regarding the specified target object (yes in step S926), the flow returns to step S924, and the target-object determination process is repeated (steps S924, S940, and S925). For example, when the "dog/cat" specifying button 333 has been pressed on the "menu for specifying a target object for automatic image capturing" screen shown in FIG. 7, if only a determination process using the dog detection dictionary 310 has been performed, a determination process using the cat detection dictionary 320 is performed. When the "dog" specifying button 331 or the "cat" specifying button 332 has been pressed on the "menu for specifying a target object for automatic image capturing" screen shown in FIG. 7, there is no other target-object detection dictionary regarding the specified target object.

When there is no other target-object detection dictionary regarding the specified target object (no in step S926), it is determined whether the image on which the target-object detection process has been performed is smaller than the extracting frame (step S927). When the image on which the target-object detection process has been performed is smaller than the extracting frame (yes in step S927), it is no more necessary to further reduce the image on which the target-object detection process has been performed and to perform a target-object detection process. Therefore, no-target-object detection information indicating that the target object has not been detected is output as a determination result (step S933).

When the image on which the target-object detection process has been performed is not smaller than the extracting frame (no in step S927), it is determined whether the extracting frame is at the right edge of the image where the extracting frame is placed. When the extracting frame is not at the right edge (no in step S928), the extracting frame is shifted in the image by one pixel in the rightward direction (step S929), and the flow returns to step S923. In contrast, when the extracting frame is at the right edge of the image (yes in step S928), it is determined whether the extracting frame is at the bottom edge of the image in the image where the extracting frame is placed (step S930). When the extracting frame is not at the bottom edge of the image (no in step S930), the extracting frame is shifted in the image by one pixel in the downward direction and then placed at the left edge of the image (step S931), and the flow returns to step S923. When the extracting frame is at the bottom edge of the image (yes in step S930), the image in which the extracting frame is placed in the lower right-hand corner is reduced at a predetermined factor (step S932). After the image has been reduced, the extracting frame is placed in the upper left-hand corner of the image (step S922).

In this example, it has been described that, when the target object is determined to be included in the image being determined, it is determined that the target object is detected in the current captured image, without performing a determination process on another image to be determined. Alternatively, even when it is determined that the target object is included in the image being determined, a determination process may be repeated until the image being determined becomes smaller than the extracting frame, and, on the basis of the determination result, it may be determined that the target object is included in the current captured image. When a plurality of target objects are specified, a determination process using target-object detection dictionaries regarding all the specified target objects may be repeatedly performed, and, on the basis of the determination results, it may be determined that the target objects have been detected in the current captured image.

Figure 17:
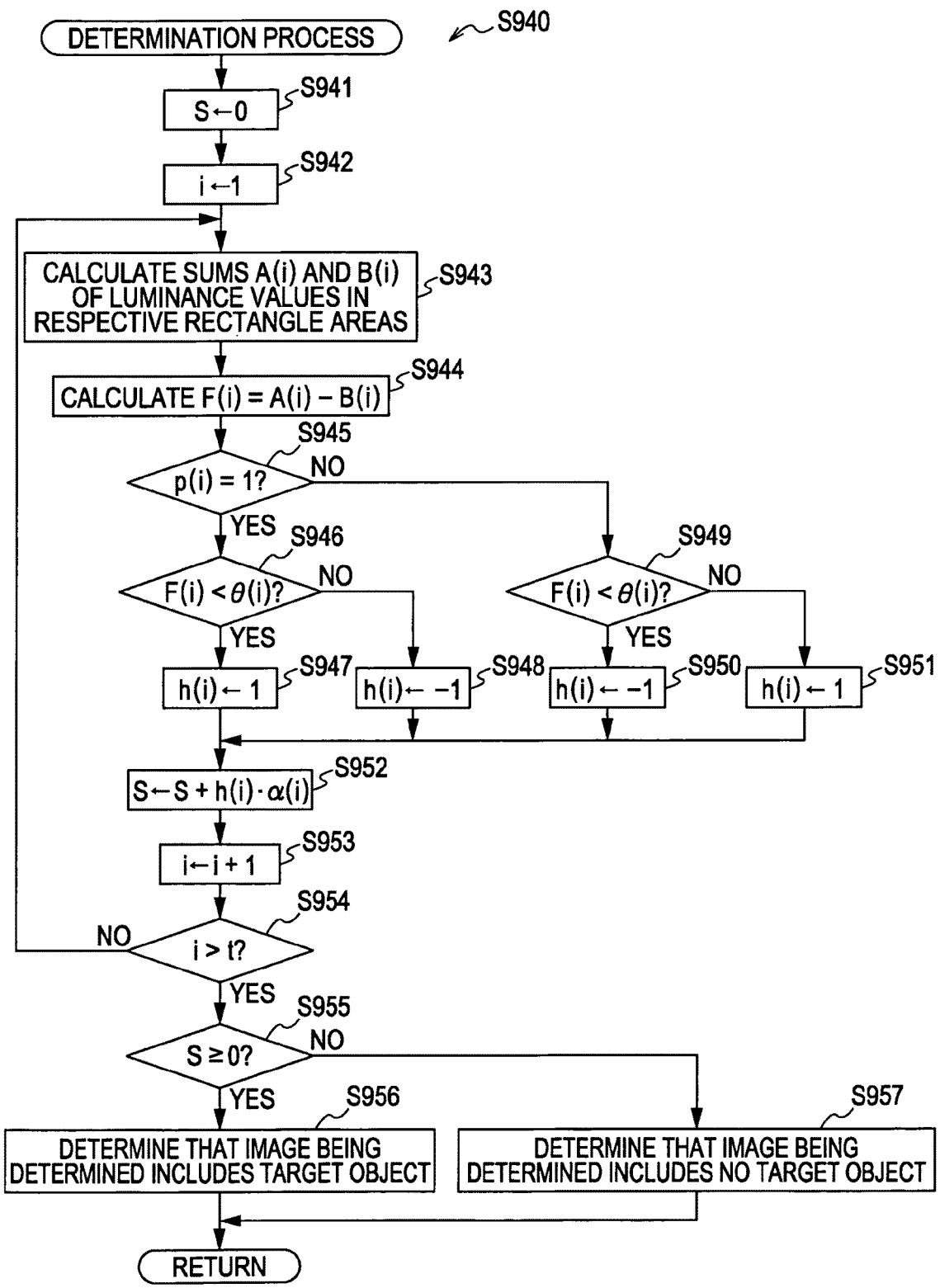
FIG. 17 is a flowchart showing the procedure of a determination process, which is part of the procedure of the target-object detection process performed by the image capturing apparatus according to the embodiment of the present invention.

FIG. 17 is a flowchart showing the procedure of the determination process (procedure in step S940 shown in FIG. 16), which is part of the procedure of the target-object detection process performed by the image capturing apparatus 100 according to the embodiment of the present invention.

At first, the score S is initialized to "0" (step S941), and the variable i is initialized to "1" (step S942). Then, a rectangle feature on the image being determined, which has been extracted within the extracting frame, is determined on the basis of values stored in the type 311, the position 312, the width 313, and the height 314 stored in the i-th line of the target-object detection dictionary stored in the target-object detection dictionary memory 235, and the sums A(i) and B(i) of luminance values included in the areas of two rectangles constituting this rectangle feature are calculated (step S943). Then, the difference value between the calculated sums A(i) and B(i) is calculated as a feature amount F(i) (step S944).

Then, it is determined whether the value of the sign 316 in the i-th line of the target-object detection dictionary stored in the target-object detection dictionary memory 235 is "p(i)=1" (step S945). When "p(i)=1" (yes in step S945), it is determined whether the calculated feature amount F(i) is smaller than a threshold θ(i) stored in the threshold 315 in the i-th line of the target-object detection dictionary stored in the target-object detection dictionary memory 235 (step S946). When the calculated feature amount F(i) is less than the threshold θ(i) (yes in step S946), it is calculated that a weak learner h(i)=1 (step S947). In contrast, when the calculated feature amount F(i) is not less than the threshold θ(i) (no in step S946), it is calculated that the weak learner h(i)=−1 (step S948).

When the value of the sign 316 in the i-th line of the target-object detection dictionary stored in the target-object detection dictionary memory 235 is not "p(i)=1" (no in step S945), the value of the sign 316 is "p(i)=−1". In this case, it is determined whether the calculated feature amount F(i) is less than the threshold θ(i) (step S949). When the calculated feature amount F(i) is less than the threshold θ(i), it is calculated that the weak learner h(i)=−1 (step S950). In contrast, when the calculated feature amount F(i) is not less than the threshold θ(i) (no in step S949), it is calculated that the weak learner h(i)=1 (step S951).

Subsequently, the value α(i) stored in the weight 317 in the i-th line of the target-object detection dictionary stored in the target-object detection dictionary memory 235 is multiplied by the calculated weak learner h(i), and the product h(i)α(i) obtained by this multiplication is added to the score S (step S952).

Then, "1" is added to the variable i (step S953), and it is determined whether the variable i is greater than or equal to t (step S954). When the variable i is not greater than t (no in step S954), a determination process using the values in each line of the target-object detection dictionary stored in the target-object detection dictionary memory 235 is not completed yet. Thus, the flow returns to step S943, and a determination process using the same target-object detection dictionary is repeated (steps S943 to S953). In contrast, when the variable i is greater than t (yes in step S954), a determination process using the values in each line of the target-object detection dictionary stored in the target-object detection dictionary memory 235 is completed. Thus, the flow proceeds to step S955, and it is determined whether the value of the score S is greater than or equal to zero (step S955).

When the value of the score S is greater than or equal to zero (yes in step S955), it is determined that the image being determined includes the target object (step S956). In contrast, when the value of the score S is less than zero (no in step S955), it is determined that the image being determined includes no target object (step S957).

Figure 18:
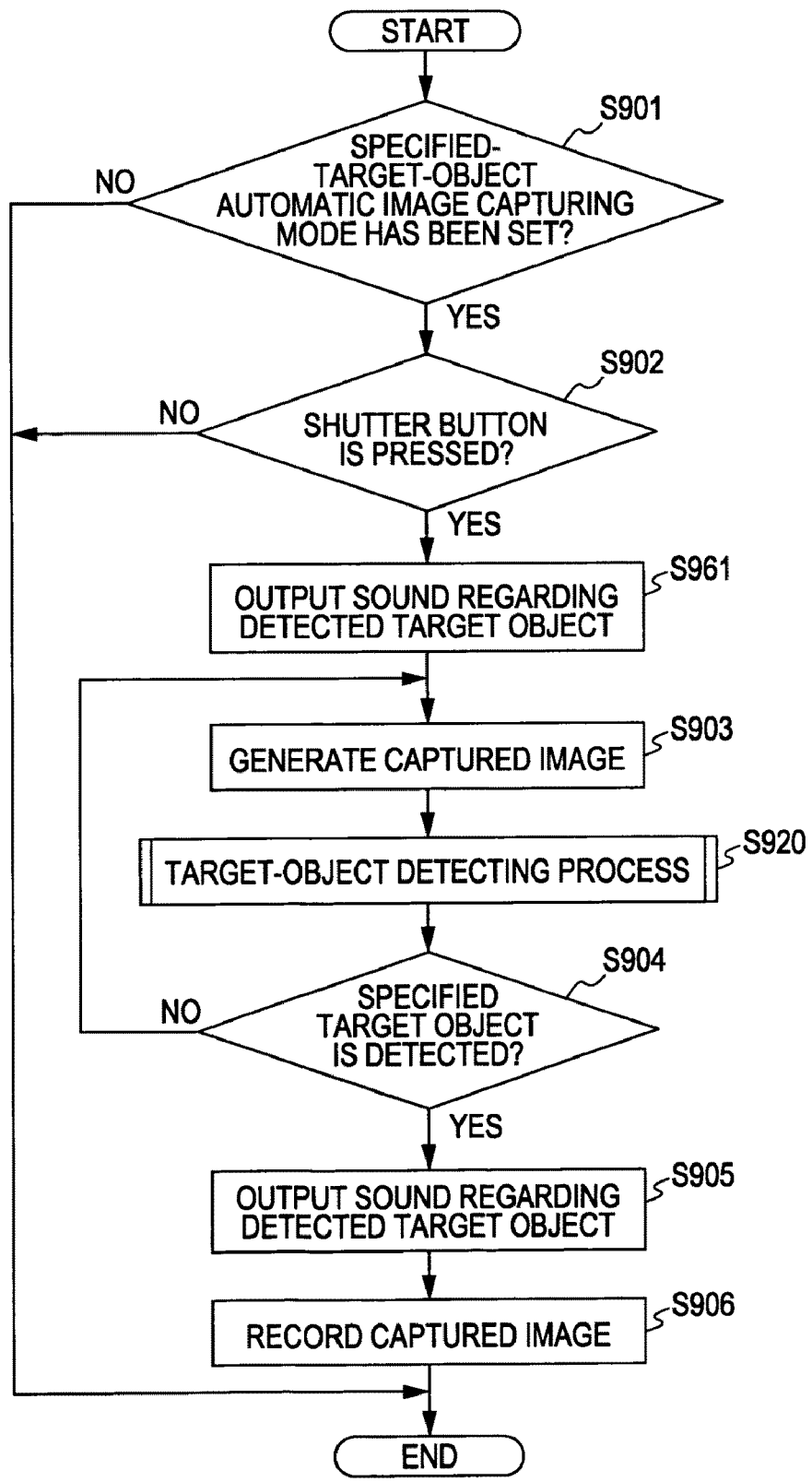
FIG. 18 is a flowchart showing the procedure of a captured-image recording process performed by the image capturing apparatus according to the embodiment of the present invention.

FIG. 18 is a flowchart showing the procedure of a captured-image recording process performed by the image capturing apparatus 100 according to the embodiment of the present invention. This procedure is obtained by modifying part of the procedure shown in FIG. 15 and is similar to the procedure shown in FIG. 15 except for the point that the procedure in step S961 is added. Thus, a detailed description of the procedure except for step S961 is omitted.

When the specified-target-object automatic image capturing mode has been set (yes in step S901), if the shutter button 171 is pressed (yes in step S902), sound corresponding to audio information stored in association with the specified target object is output (step S961). When the "dog/cat" specifying button 333 has been pressed on the "menu for specifying a target object for automatic image capturing" screen shown in FIG. 7, sounds corresponding to items of audio information stored in association with a dog and a cat may be output at the same time or may be output alternately. Alternatively, only one of the sounds may be output.

The foregoing description concerns the example in which, when the "dog" specifying button 331 has been pressed on the "menu for specifying a target object for automatic image capturing" screen shown in FIG. 7, sound corresponding to audio information regarding a dog is output in the case where the front side of a dog's face is detected. In this case, for example, even before the front side of the dog's face is directed toward the image capturing apparatus 100, if the front side of the dog's face is directed, to a certain degree, toward the image capturing apparatus 100, it is conceivable that outputting the sound corresponding to the audio information increases the possibility of the front side of the dog's face being directed toward the image capturing apparatus 100. In the following description, an example in which, when the lateral side and the front side of a dog's face or a cat's face are detected, sound corresponding to audio information regarding the detected target object is output will be described.

Figure 19:
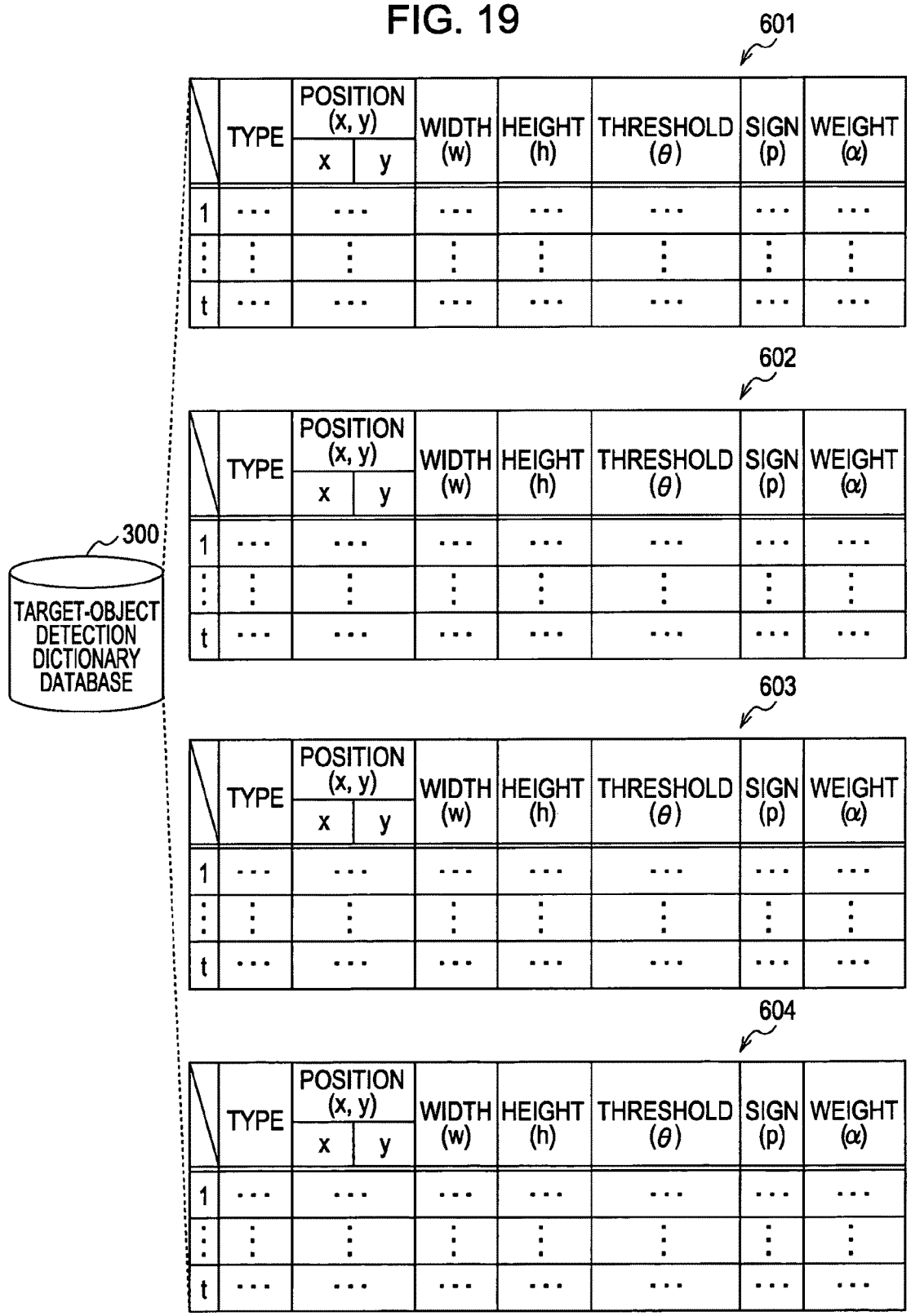
FIG. 19 includes diagrams schematically showing target-object detection dictionaries stored in the target-object detection dictionary database according to the embodiment of the present invention.

FIG. 19 includes diagrams schematically showing target-object detection dictionaries stored in the target-object detection dictionary database 300 according to the embodiment of the present invention. In this example described below, the target-object detection dictionary database 300 stores a dog's front face detection dictionary 601, a cat's front face detection dictionary 602, a dog's lateral face detection dictionary 603, and a cat's lateral face detection dictionary 604. The dog's front face detection dictionary 601 is a target-object detection dictionary for detecting a dog's front face. The cat's front face detection dictionary 602 is a target-object detection dictionary for detecting a cat's front face. The dog's lateral face detection dictionary 603 is a target-object detection dictionary for detecting a dog's lateral face. The cat's lateral face detection dictionary 604 is a target-object detection dictionary for detecting a cat's lateral face. Because the dog's front face detection dictionary 601, the cat's front face detection dictionary 602, the dog's lateral face detection dictionary 603, and the cat's lateral face detection dictionary 604 are the same as the dog detection dictionary 310 and the cat detection dictionary 320 shown in FIG. 5 except for the point that the values stored in individual items are different, a detailed description thereof is omitted.

For example, when the specified-target-object automatic image capturing mode has been set by pressing the "dog" specifying button 331 on the "menu for specifying a target object for automatic image capturing" screen shown in FIG. 7, the front side and the lateral side of a dog's face can be detected using the dog's front face detection dictionary 601 and the dog's lateral face detection dictionary 603.

Figure 20A:
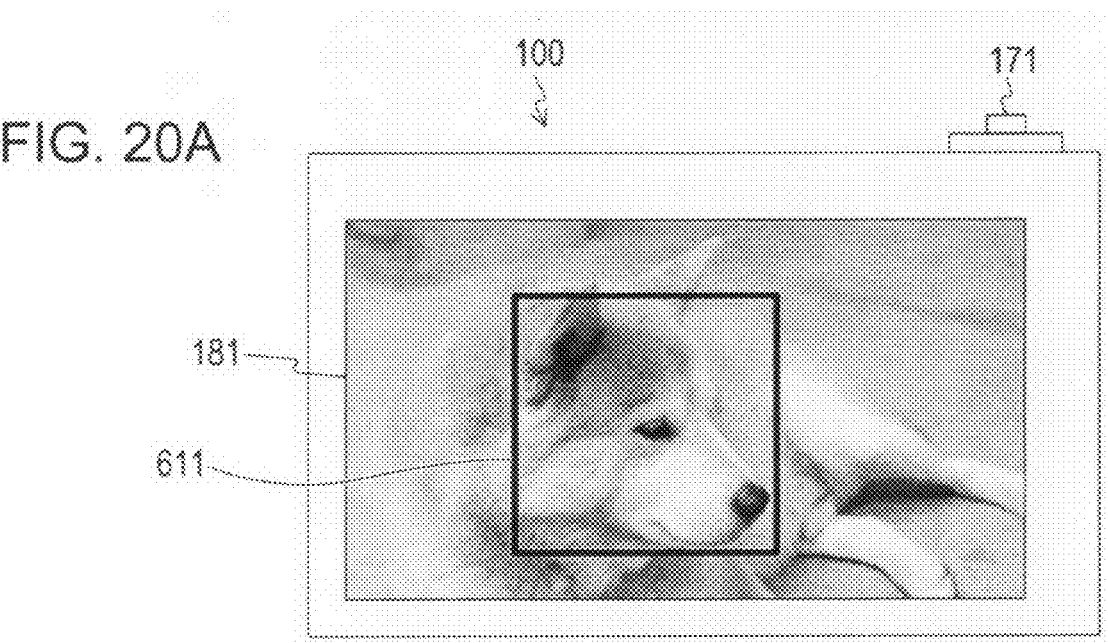
FIGS. 20A and 20B are diagrams showing display examples of the liquid crystal panel when an image of a dog is captured using the image capturing apparatus according to the embodiment of the present invention.
Figure 20B:
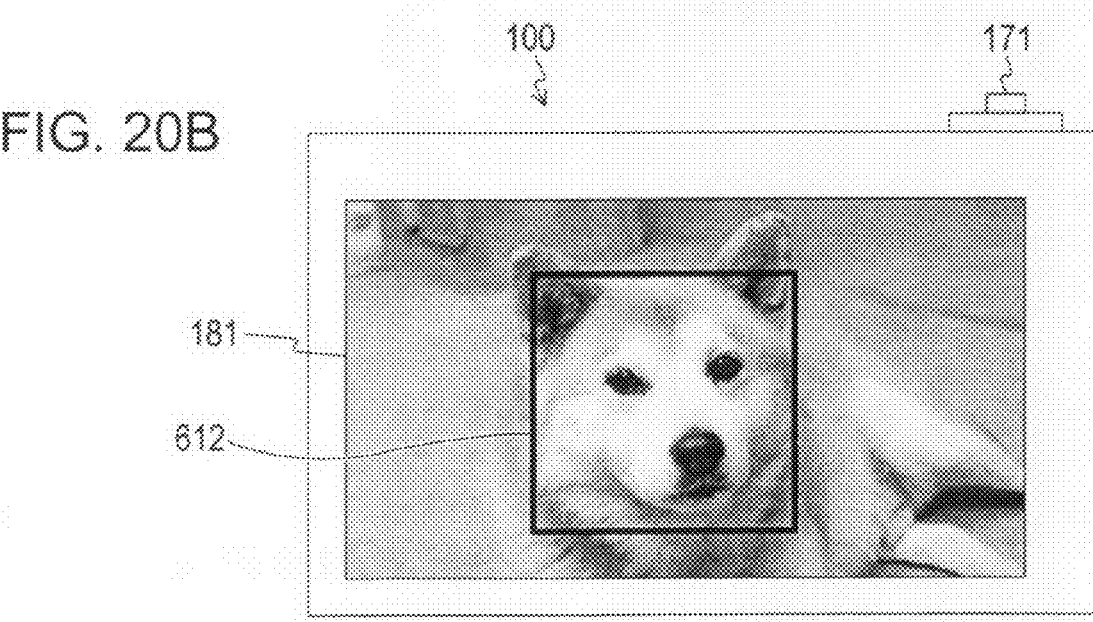

FIGS. 20A and 20B are diagrams showing display examples of the liquid crystal panel 181 when an image of a dog is captured using the image capturing apparatus 100 according to the embodiment of the present invention. FIG. 20A shows a state in which the liquid crystal panel 181 displays an image of the lateral side of a dog's face. FIG. 20B shows a state in which the liquid crystal panel 181 displays an image of the front side of the dog's face. In the case shown in FIG. 20a, the captured image includes the dog's lateral face. Therefore, a marker 611 is placed around the dog's face detected in the captured image, and the sound "bow-wow" corresponding to the audio information is output from the audio output unit 190. In the case shown in FIG. 20B, the captured image includes the dog's front face. Therefore, a marker 612 is placed around the dog's face detected in the captured image, and the sound "bow-wow" corresponding to the audio information is output from the audio output unit 190. Recording of the captured image will be described in detail with reference to FIGS. 21 and 22.

Figure 21:
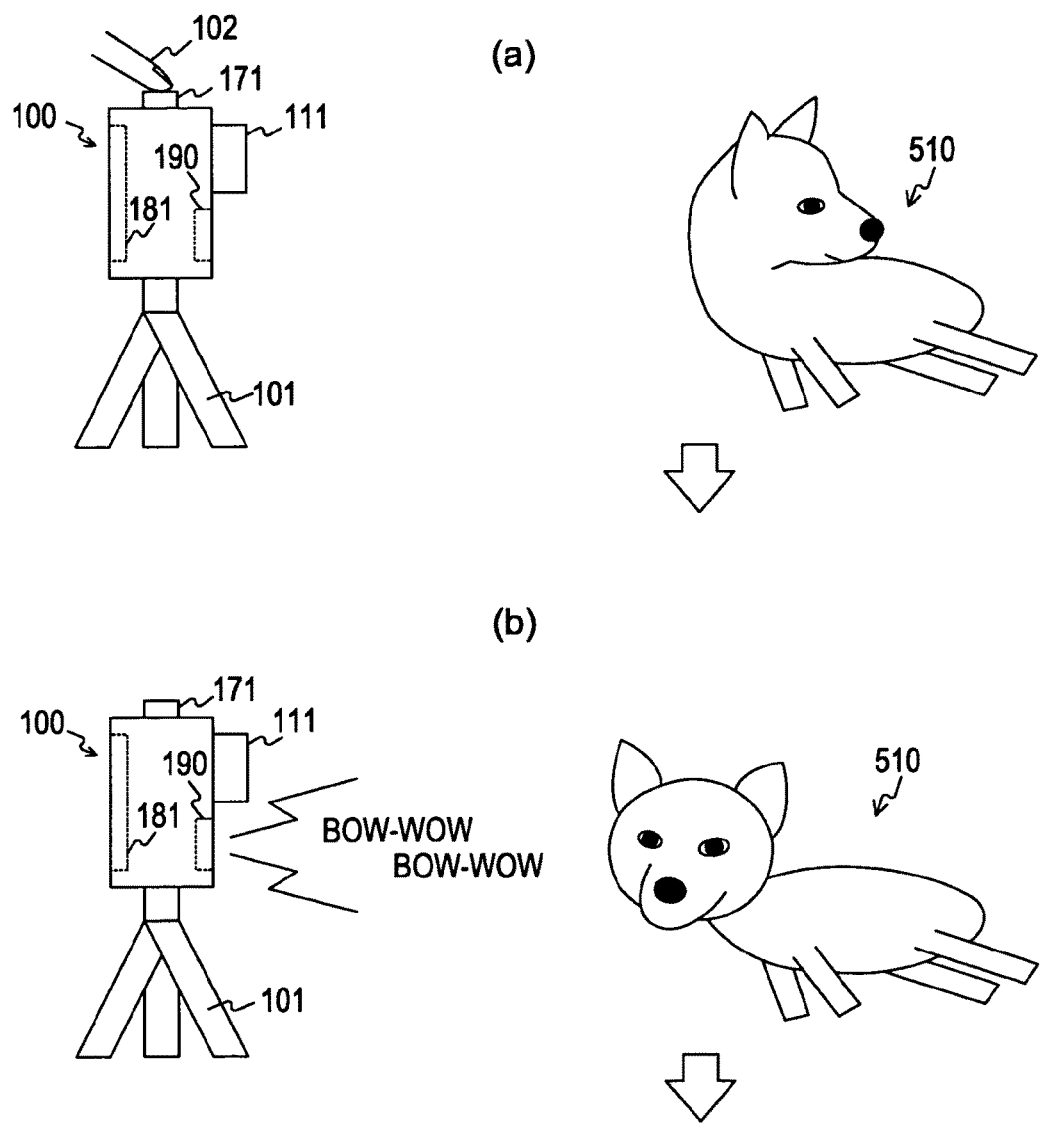
FIG. 21 includes diagrams schematically showing the case where an image of a dog is captured using the image capturing apparatus according to the embodiment of the present invention.
Figure 22:
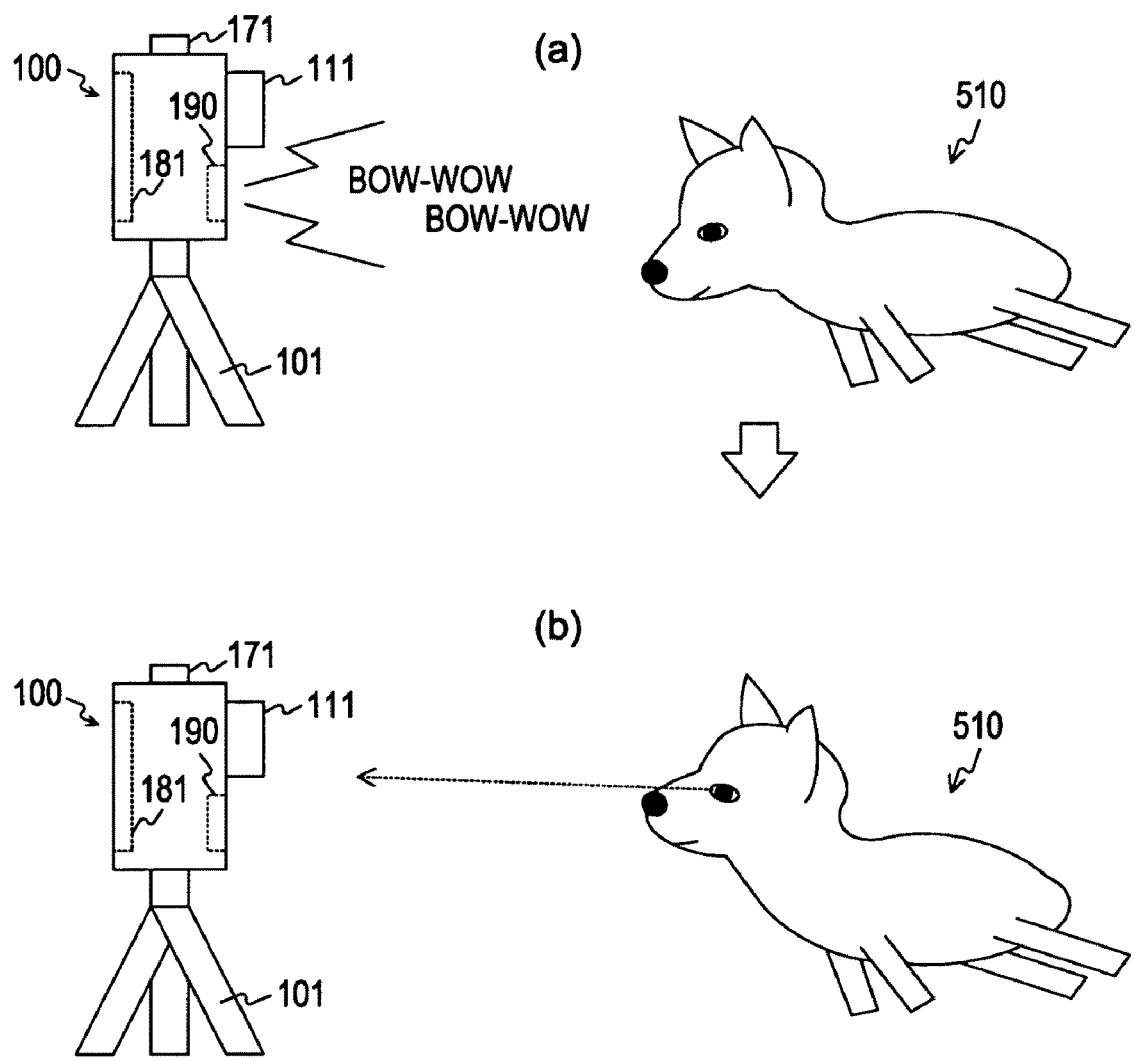
FIG. 22 includes diagrams schematically showing the case where an image of a dog is captured using the image capturing apparatus according to the embodiment of the present invention.

FIGS. 21 and 22 include diagrams schematically showing the case where an image of a dog is captured using the image capturing apparatus 100 according to the embodiment of the present invention. In part (a) of FIG. 21, in order to capture an image of the dog 510 lying on the floor, the image capturing apparatus 100 is fixed to the tripod 101 so that the image capturing apparatus 100 can be arranged facing the dog 510. However, the face of the dog 510 is directed toward the opposite direction from the lens 111. The following description concerns an example in which, in a state where the specified-target-object automatic image capturing mode has been set by pressing by the user the "dog" specifying button 331 on the "menu for specifying a target object for automatic image capturing" screen shown in FIG. 7, the shutter button 171 is pressed by the user.

As shown in part (a) of FIG. 21, when the shutter button 171 is pressed by the finger 102, the target-object detecting unit 230 starts a dog detecting process of detecting a dog in a captured image. In a state where the specified-target-object automatic image capturing mode has been set, if the shutter button 171 is pressed, no captured image will be recorded until the face of the dog 510 is detected. As shown in part (b) of FIG. 21, when the lateral side of the face of the dog 510 is detected by the target-object detecting unit 230, the sound "bow-wow" corresponding to the audio information is output from the audio output unit 190. When the lateral side of the face of the dog 510 is detected, only the sound "bow-wow" corresponding to the audio information is output, and no captured image is recorded. As shown in part (a) of FIG. 22, when the front side of the face of the dog 510 is detected by the target-object detecting unit 230, the sound "bow-wow" corresponding to the audio information is output from the audio output unit 190. Subsequently, as shown in part (b) of FIG. 22, a captured image is recorded immediately after the sound "bow-wow" corresponding to the audio information has been output from the audio output unit 190.

In this manner, when the lateral side of the face of the dog 510 is detected, it can be conceivable that the dog 510 is starting to direct its face toward the lens 111. By drawing the attention of the dog 510 to the lens 111 by outputting the sound "bow-wow" corresponding to audio information regarding a dog at the time of the detection, the possibility of the dog 510 directing its face toward the lens 111 can be increased. When the front side of the face of the dog 510 is detected, the sound "bow-wow" corresponding to audio information regarding a dog is output at the time of the detection, thereby further drawing the attention of the dog 510 and causing the dog 510 to direct its face further toward the lens 111. Then, a captured image is recorded. In this manner, the sound "bow-wow" corresponding to audio information regarding a dog is output at two stages, namely, when the lateral side of the dog's face is detected and when the front side of the dog's face is detected. Therefore, the attention of the dog 510 can be further drawn to the lens 111, and the possibility of the dog 510 directing its face toward the lens 111 can be increased.

As in FIG. 14, two different items of audio information (e.g., high "bow-wow" and low "bow-wow") regarding a dog may be stored in the audio storage unit 160. In this way, sound output at the time the lateral side of a dog's face is detected may be made different from sound output at the time the front side of a dog's face is detected. By outputting different sounds at two stages in this manner, attention of the dog 510 can be further drawn.

Figure 23:
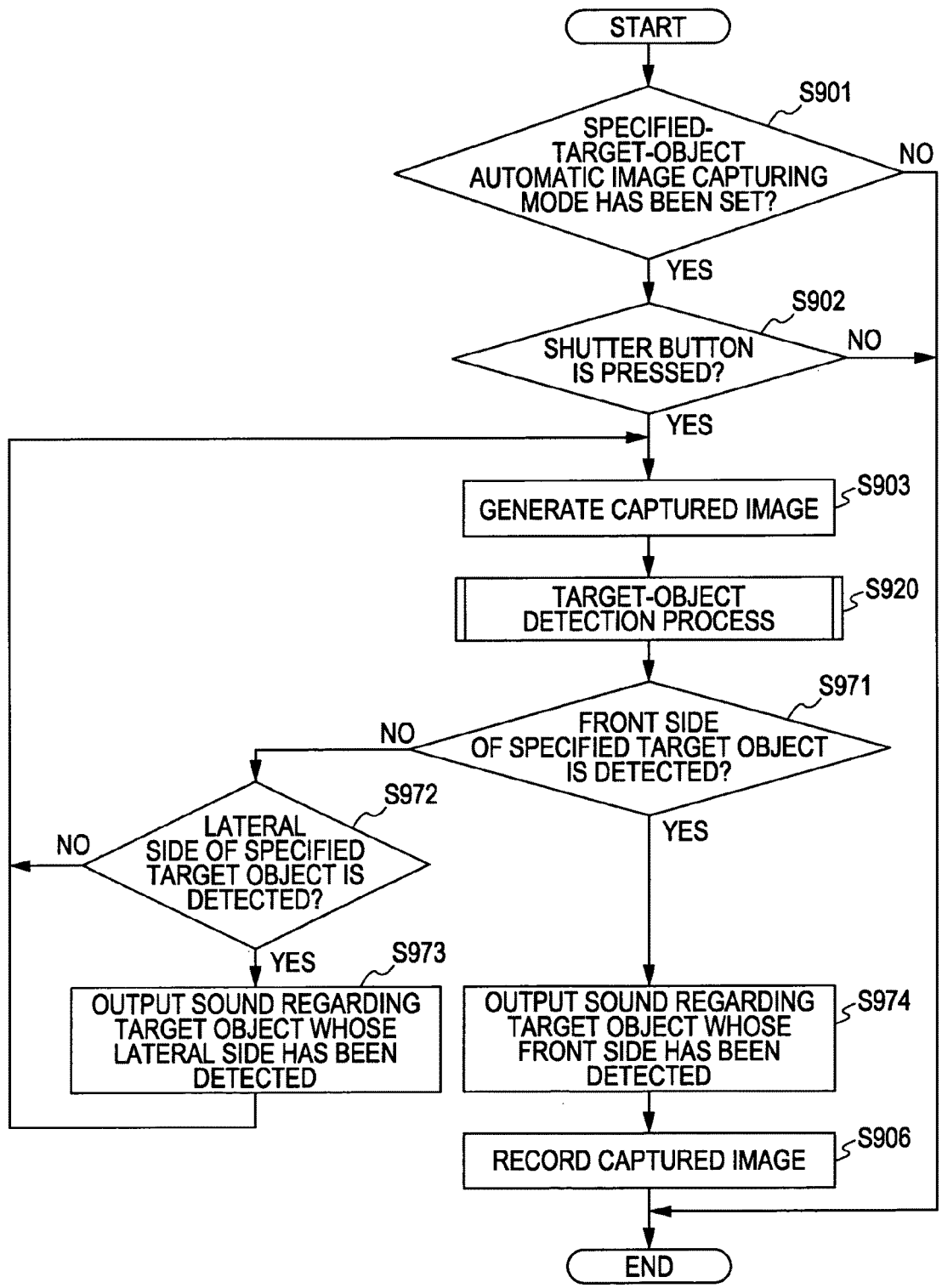
FIG. 23 is a flowchart showing the procedure of a captured-image recording process performed by the image capturing apparatus according to the embodiment of the present invention.

FIG. 23 is a flowchart showing the procedure of a captured-image recording process performed by the image capturing apparatus 100 according to the embodiment of the present invention. This procedure is obtained by modifying part of the procedure shown in FIG. 15 and is similar to the procedure shown in FIG. 15 except for the point that steps S971 and S974 are provided instead of steps S904 and S905 and further the procedure in steps S972 and S973 is added. Thus, a detailed description of the procedure except for the procedure in steps S971 to S974 is omitted.

A target-object detection process is performed on a captured image generated by the image pickup unit 112 (S920). It is determined whether the target-object detecting unit 230 has detected the front side of a specified target object in the captured image generated by the image pickup unit 112 (step S971). When the front side of the specified target object is not detected in the captured image generated by the image pickup unit 112 (no in step S971), it is determined whether the target-object detecting unit 230 has detected the lateral side of the specified target object in the captured image generated by the image pickup unit 112 (step S972). When the lateral side of the specified target object has been detected in the captured image generated by the image pickup unit 112 (yes in step S972), sound corresponding to audio information stored in association with the detected target object whose lateral side has been detected is output from the audio output unit 190 (step S973). The flow returns to step S903. In contrast, when the lateral side of the specified target object is not detected in the captured image generated by the image pickup unit 112 (no in step S972), the flow returns to step S903.

When the front side of the specified target object has been detected in the captured image generated by the image pickup unit 112 (yes in step S971), sound corresponding to audio information stored in association with the detected target object whose front side has been detected is output from the audio output unit 190 (step S974), and the current captured image is recorded in the recording unit 150 (step S906).

The foregoing description concerns the example where, to draw attention of a target object at the time of recording a captured image, sound corresponding to audio information regarding the detected target object is output, and the captured image is recorded. By outputting sound corresponding to audio information regarding a specified target object in this manner, the target object's attention can be drawn, and the user can be notified of the fact that the captured image has been recorded. If, for example, a notification in accordance with whether the recorded captured image is blurred can be given, the user who has received the notification can promptly determine, for example, whether it is necessary to capture an image again. The following description concerns an example in which, at the time of recording a captured image, the user is notified of whether the recorded captured image is blurred by outputting sounds corresponding to different items of audio information in accordance with whether the captured image is blurred.

FIG. 24 is a diagram schematically showing the details stored in an audio storage unit 700 according to the embodiment of the present invention. In this example, the case where the image capturing apparatus 100 includes the audio storage unit 700 instead of the audio storage unit 160 will be described. In the audio storage unit 700, a target object 701 and audio information 702 are stored in association with each other.

The target object 701 is a target object that can be specified as a target object of which an image is to be automatically captured. For example, a "dog" or a "cat" is stored as the target object 701. The target object 701 corresponds to the target object 161 shown in FIG. 6.

The audio information 702 is audio information for outputting sound from the audio output unit 190. Two items of audio information, one for a "blurred image" and the other for a "not blurred image", are stored in association with a target object. Referring to FIG. 24, for example, audio information for a "not blurred image" stored in association with a "dog" is represented as "bow-wow", and audio information for a "blurred image" stored in association with a "dog" is represented as "ki-yi". Audio information for a "not blurred image" stored in association with a "cat" is represented as "meow-meow", and audio information for a "blurred image" stored in association with a "cat" is represented as "fft-fft". In this example, the case where audio information for a "not blurred image" is used as audio information based on which sound is output when a target object is detected will be described.

Figure 25:
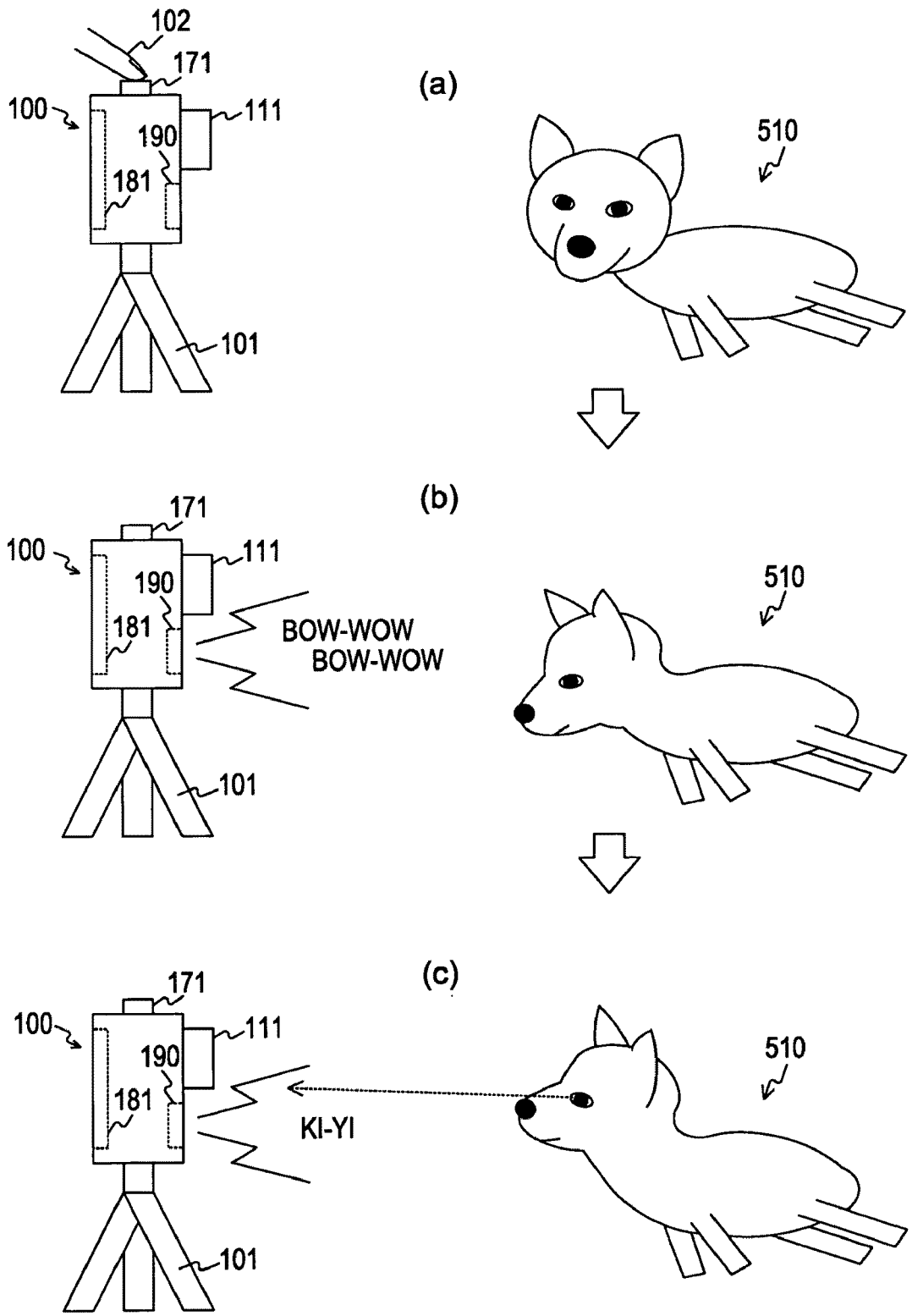
FIG. 25 includes diagrams schematically showing the case where an image of a dog is captured using the image capturing apparatus according to the embodiment of the present invention.

FIG. 25 includes diagrams schematically showing the case where an image of a dog is captured using the image capturing apparatus 100 according to the embodiment of the present invention. The example shown in FIG. 25 is the same as that shown in FIG. 13 except for the point that, at the time of recording a captured image, sounds corresponding to different items of audio information are output in accordance with whether the captured image is blurred (which is shown in part (c) of FIG. 25)). Therefore, part (c) of FIG. 25 will be described in detail, and a detailed description of other parts will be omitted.

As shown in part (b) of FIG. 25, when the face of the dog 510 is detected by the target-object detecting unit 230, the sound "bow-wow" corresponding to audio information for a "not blurred image" is output from the audio output unit 190. Subsequently, as shown in part (c) of FIG. 25, a captured image is recorded immediately after the sound "bow-wow" corresponding to the audio information has been output from the audio output unit 190. At the time of recording the captured image, it is determined whether the captured image is blurred. When the captured image is determined to be blurred, as shown in part (c) of FIG. 25, the sound "ki-yi" corresponding to audio information for a "blurred image" is output from the audio output unit 190. Whether a captured image is blurred can be determined by, for example, evaluating, using the camera-parameter control unit 220, the current captured image obtained from the storage unit 130 via the storage unit I/F 240. That is, when there are more relatively high frequency components among the frequency components of the current captured image, it is determined that the captured image is not blurred. When there are fewer relatively high frequency components among the frequency components of the current captured image, it is determined that the captured image is blurred.

When a dog's face is detected, the sound "bow-wow" corresponding to audio information for a "not blurred image" is output. At the time of recording a captured image, when it is determined that the captured image is blurred, the sound "ki-yi" corresponding to audio information for a "blurred image" is output, thereby promptly notifying the user of the fact that, although a captured image of the front side of the face of the dog 510 has been recorded, the captured image is blurred. By outputting, instead of a normal shutter sound output at the time of capturing an image, sound corresponding to audio information regarding a target object in accordance with whether the image is blurred, the image capturing becomes more interesting. Alternatively, evaluation of a captured image other than determining whether the captured image is blurred may be performed, and sound corresponding to audio information may be output in accordance with the evaluation result of the captured image. For example, an evaluation value indicating a focus level, an evaluation value indicating the degree of how close the image capturing apparatus 100 is to the specified target object, and an evaluation value indicating brightness of the subject in the captured image are calculated. These evaluation values can be used as an evaluation result. For example, when all these evaluation values are high, the sound "bow-wow" corresponding to the audio information may be output. When any of these evaluation values is low, the sound "ki-yi" corresponding to the audio information may be output.

FIG. 26 is a flowchart showing the procedure of a captured-image recording process performed by the image capturing apparatus 100 according to the embodiment of the present invention. This procedure is obtained by modifying part of the procedure shown in FIG. 15 and is similar to the procedure shown in FIG. 15 except for the point that step S981 is provided instead of step S905 and further the procedure in steps S982 to S984 is added. Thus, a detailed description of the procedure except for the procedure in steps S981 to S984 is omitted.

It is determined whether the target-object detecting unit 230 has detected the specified target object in the captured image generated by the image pickup unit 112 (step S904). When the specified target object is detected in the captured image generated by the image pickup unit 112 (yes in step S904), sound corresponding to audio information for a "not blurred image" stored in association with the detected target object is output from the audio output unit 190 (step S981).

It is determined whether the current captured image recorded in the recording unit 150 is blurred (step S982). When it is determined that the current captured image recorded in the recording unit 150 is blurred (yes in step S982), sound corresponding to audio information for a "blurred image" stored in association with the detected target object is output from the audio output unit 190 (step S983). In contrast, when it is determined that the current captured image recorded in the recording unit 150 is not blurred (no in step S982), sound corresponding to audio information for a "not blurred image" stored in association with the detected target object is output from the audio output unit 190 (step S984).

As has been described above, in the embodiment of the present invention, for example, since a captured image of an animal that does not understand the user's instructions is recorded at the time the animal's face is detected, a captured image can be recorded at an appropriate timing which is at the moment at which the animal's face is directed toward the lens 111. By outputting sound corresponding to audio information regarding the animal at the time the animal's face is detected, attention of the animal can be drawn to the image capturing apparatus 100. Therefore, a captured image can be recorded at the moment at which the animal's face is directed further toward the lens 111. Accordingly, in order to record a captured image of the front side of the animal's face, a captured image can be recorded at an appropriate timing at which the animal's face is directed toward the image capturing apparatus 100. That is, a captured image of a target object that does not understand the photographer's instructions can be appropriately recorded. By outputting sound corresponding to audio information regarding the animal at the time of recording a captured image, attention of the animal can be drawn, and the user can be notified of the fact that the captured image is recorded. By outputting sound regarding the animal at the time of capturing an image of the animal, an image capturing apparatus with an entertaining feature can be provided.

Since target-object detection dictionaries stored in the target-object detection dictionary database 300 are each used as determination information for determining whether a captured image includes a target object, the dictionary used in a determination process can be switched. Therefore, even when a plurality of target objects are specified, the plurality of target objects can be detected. For example, the eyes of a dog have a smaller white area, and it is therefore often difficult to identify the dog's line of sight. Thus, it is often difficult to detect a dog's front face. Therefore, in the embodiment of the present invention, the accuracy of detecting a target object that is difficult to detect can be improved by performing a determination process using a rectangle feature.

Although the diagrams illustrated in the embodiment of the present invention show examples in which sound corresponding to audio information stored in the audio storage unit 160 is output once or twice, the sound may be repeatedly output for a predetermined period of time. Further, the output time may be set by the user. Audio information stored in the audio storage unit 160 may be stored by the user. For example, the user may record the bark of his/her dog or of the same type of dog and store the recorded bark in the audio storage unit 160. Using this bark, automatic image capturing may be performed.

Although the example in which one captured image is recorded by pressing the shutter button 171 once has been described in the embodiment of the present invention, a plurality of (e.g., six) captured images may be successively recorded by pressing the shutter button 171 once. Alternatively, a captured image may be recorded every time a target object is detected until the number of recorded captured images reaches a predetermined number.

Although it has been described in the embodiment of the present invention that a "dog" or a "cat" serves as a target object by way of example, the embodiment of the present invention is applicable to the case where another animal, such as a mammal, serves as a target object. The embodiment of the present invention is also applicable to the case where a human baby serves as a target object. When a human baby serves as a target object, the mother's voice calling the baby may be used as audio information regarding the baby.

In order to increase the accuracy of detecting a target object, for example, a target-object detection dictionary may be provided for every type of target object. In the case of dogs, for example, a target-object detection dictionary for detecting the face of a dog that is general in Japan (e.g., the face of a Shiba Inu ("Little Brushwood Dog") that is cocoa brown (yellowish brown)), a target-object detection dictionary for detecting a "Chihuahua", and the like may be provided.

Although the example in which target-object detection dictionaries stored in the target-object detection dictionary database 300 are each used as determination information for determining whether a captured image includes a target object has been described in the embodiment of the present invention, another determination process of determining whether a captured image includes a target object may be employed. For example, a determination process using a determination unit that employs, instead of a rectangle feature, a difference value between luminance values at two points in an image being determined may be performed.

The embodiment of the present invention is applicable to various image capturing apparatuses, such as a camcorder (camera and recorder) that captures still and moving images and a mobile phone with an image capturing function.

The embodiment of the present invention is illustrated by way of example to realize the present invention. Although there is a correspondence between the embodiment and the features of the claims, which will be described below, the present invention is not limited thereto, and various modifications can be made without departing from the spirit and scope of the present invention.

That is, according to an embodiment of the present invention, image capturing means corresponds to, for example, the image pickup unit 112. Determination-information storage means corresponds to, for example, the target-object detection dictionary database 300. Operation accepting means corresponds to, for example, the operation input unit 170 and the liquid crystal panel 181. Target-object detecting means corresponds to, for example, the target-object detecting unit 230. Recording control means corresponds to, for example, the system control unit 120.

According to another embodiment of the present invention, audio-information storage means corresponds to, for example, the audio storage unit 160. Audio-output control means corresponds to, for example, the system control unit 120.

According to another embodiment of the present invention, audio-information storage means corresponds to, for example, the audio storage unit 160. Captured-image evaluating means corresponds to, for example, the camera-parameter control unit 220. Audio-output control means corresponds to, for example, the system control unit 120.

According to another embodiment of the present invention, image-capturing control means corresponds to, for example, the camera-parameter control unit 220.

According to another embodiment of the present invention, audio-information storage means corresponds to, for example, the audio storage unit 160. Operation accepting means corresponds to, for example, the operation input unit 170 and the liquid crystal panel 181. Image capturing means corresponds to, for example, the image pickup unit 112. Target-object detecting means corresponds to, for example, the target-object detecting unit 230. Audio-output control means corresponds to, for example, the system control unit 120. Recording control means corresponds to, for example, the system control unit 120.

According to another embodiment, the step of capturing an image corresponds to, for example, step S903. The step of detecting a target object corresponds to, for example, step S920. The step of controlling recording corresponds to, for example, step S906.

The procedures described in the embodiment of the present invention may be considered as a method having a series of these procedures or may be considered as a program for causing a computer to execute the series of procedures or as a recording medium having the program recorded thereon.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   audio-information storage means for storing audio information regarding each of a plurality of target objects in association with the target object;
   operation accepting means for accepting a specifying operation of specifying at least one of the plurality of target objects stored in the audio-information storage means;
   image capturing means for capturing an image of a subject and generating a captured image;
   target-object detecting means for detecting the specified target object in the captured image;
   audio-output control means for causing, at the time the specified target object is detected, sound corresponding to audio information stored in association with the detected target object in the audio-information storage means to be output; and
   recording control means for causing the captured image to be recorded after the sound corresponding to the audio information regarding the detected target object is output,
   wherein each of the plurality of target objects stored in the audio-information storage means has a front side and a lateral side,
   wherein the target-object detecting means detects the front side or the lateral side of the specified target object in the captured image,
   wherein the audio-output control means causes, at the time the front side or the lateral side of the specified target object is detected, sound corresponding to audio information stored in the audio-information storage means in association with the target object whose front side or lateral side is detected to be output,
   wherein the recording control means causes the captured image to be recorded when, at the time the front side of the specified target object is detected, sound corresponding to audio information regarding the target object whose front side is detected is output, and
   wherein the audio-output control means causes, when the front side of the specified target object is detected after the lateral side of the specified target object is detected, the sound corresponding to the audio information regarding the target object whose front side is detected to be output.

* * * * *